Dec. 7, 1943.  W. L. LEWIS ET AL  2,335,949
PUNCHING MACHINE
Filed Aug. 6, 1941   13 Sheets-Sheet 1

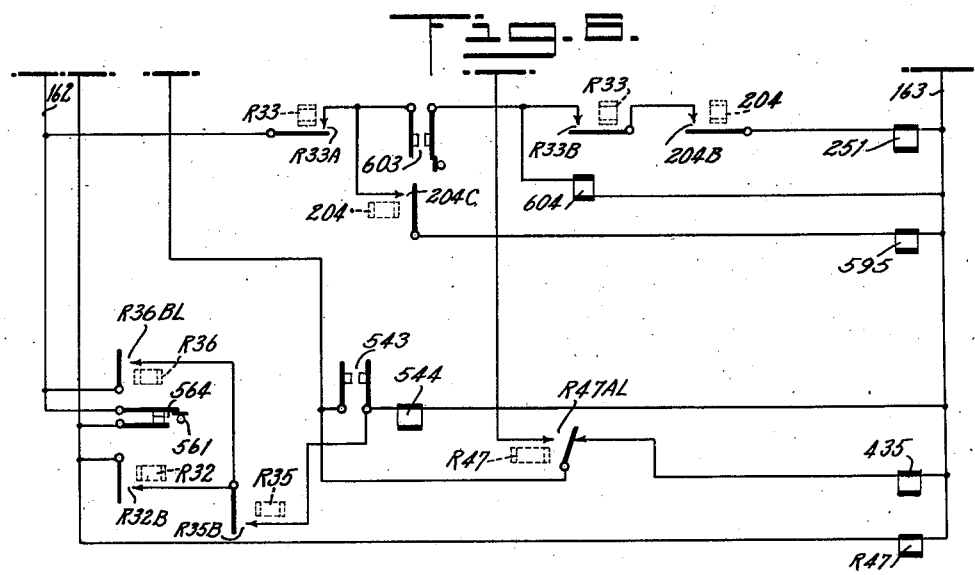
Fig.6.
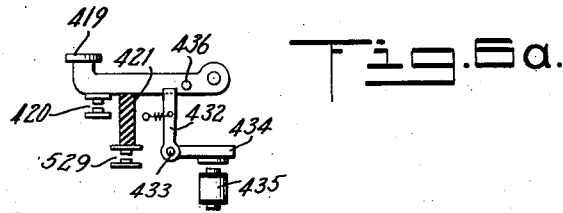
Fig.6a.
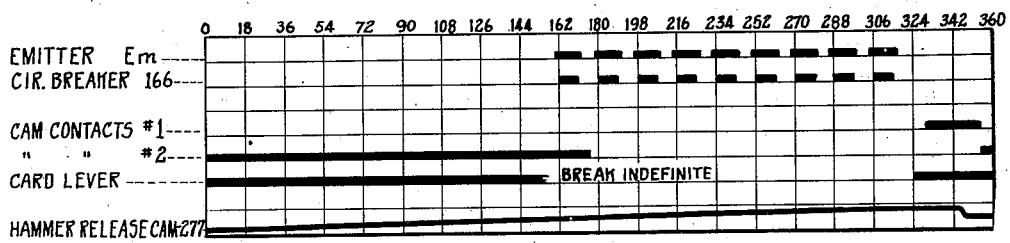
Fig.6c.
| KEY | RELAY | RELAY |
|---|---|---|
| 1 | R37 | R1 |
| 2 | R38 | R2 |
| 3 | R39 | R3 |
| 4 | R40 | R4 |
| 5 | R41 | R1-R2 |
| 6 | R42 | R1-R3 |
| 7 | R43 | R1-R4 |
| 8 | R44 | R1-R3 |
| 9 | R45 | R2-R4 |
| 0 | R48 | |
Fig.6b.
INVENTORS
William L. Lewis
Elliott W. Gardiner
BY
ATTORNEY Dec. 7, 1943.   W. L. LEWIS ET AL   2,335,949
PUNCHING MACHINE
Filed Aug. 6, 1941   13 Sheets-Sheet 6
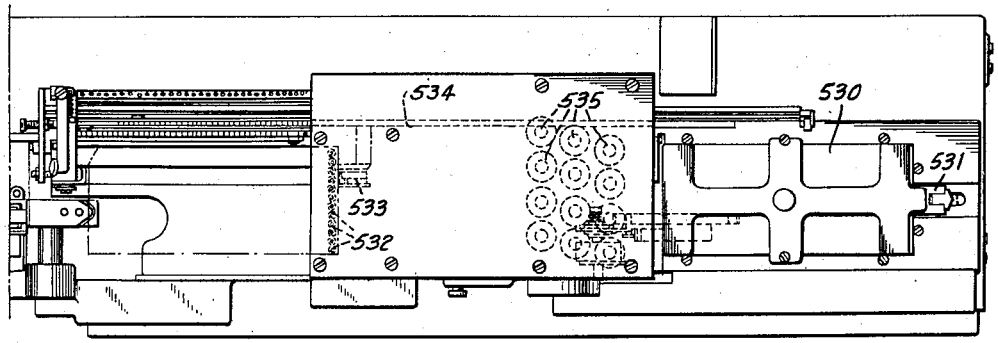
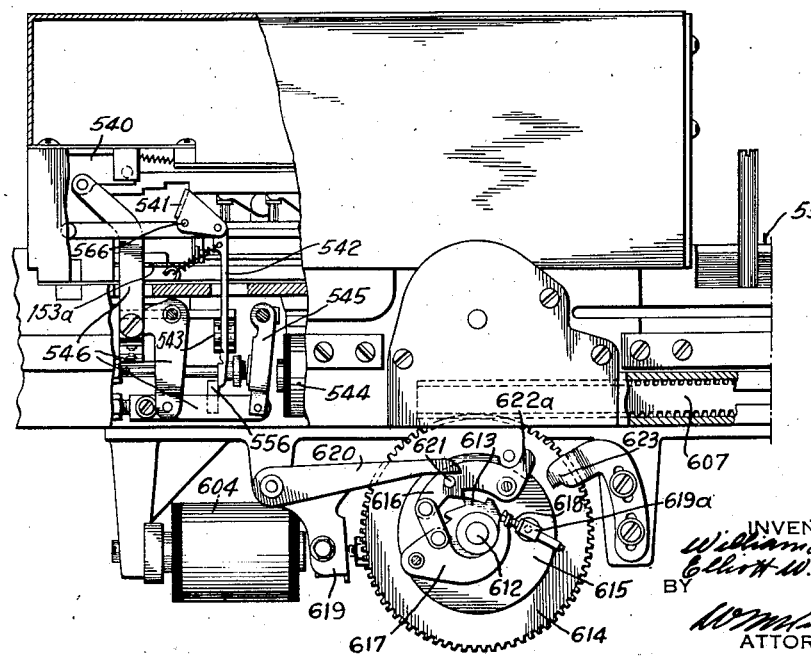

Dec. 7, 1943.  W. L. LEWIS ET AL  2,335,949
PUNCHING MACHINE
Filed Aug. 6, 1941   13 Sheets-Sheet 7
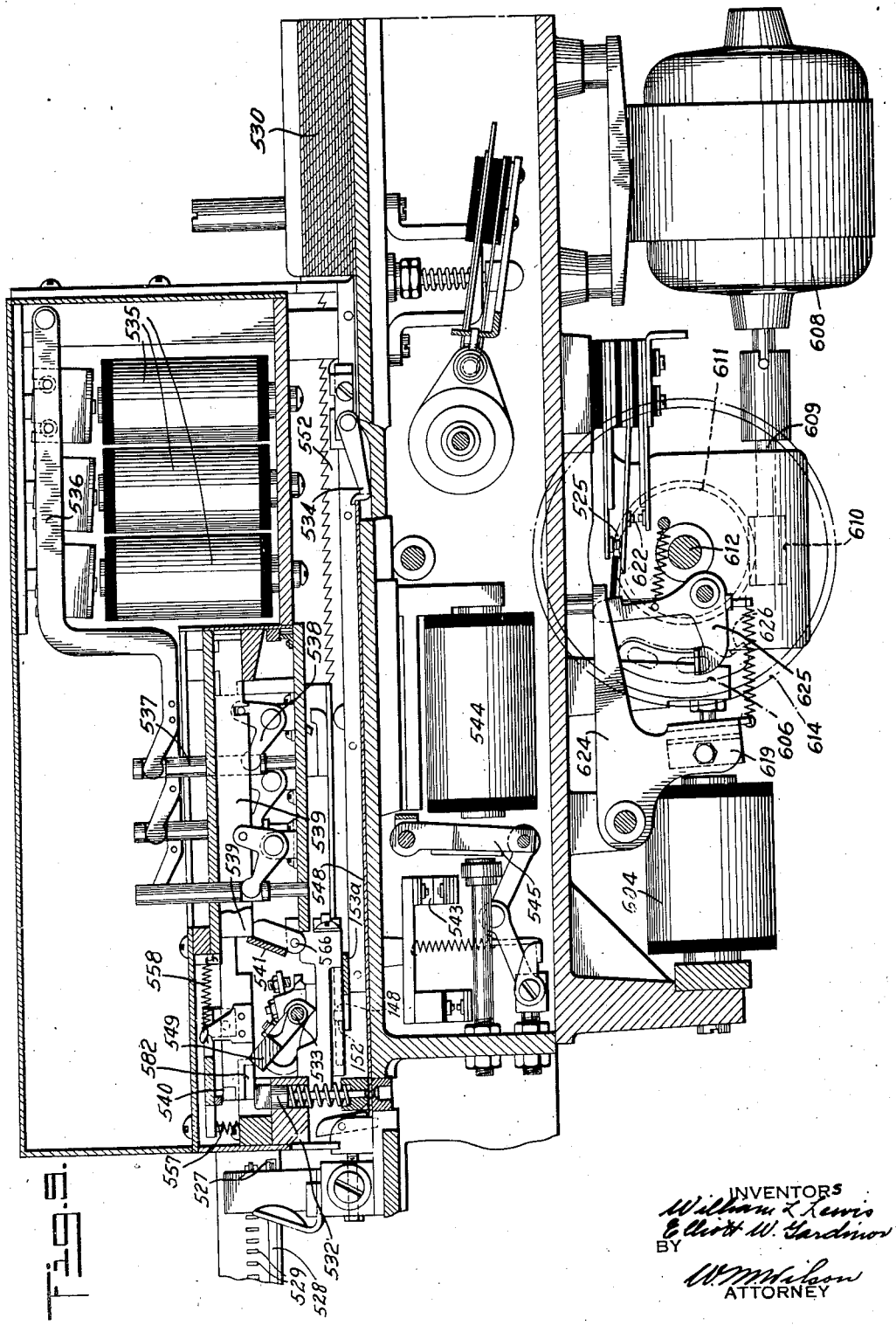
INVENTORS
William L. Lewis
Elliot W. Gardiner
BY
ATTORNEY

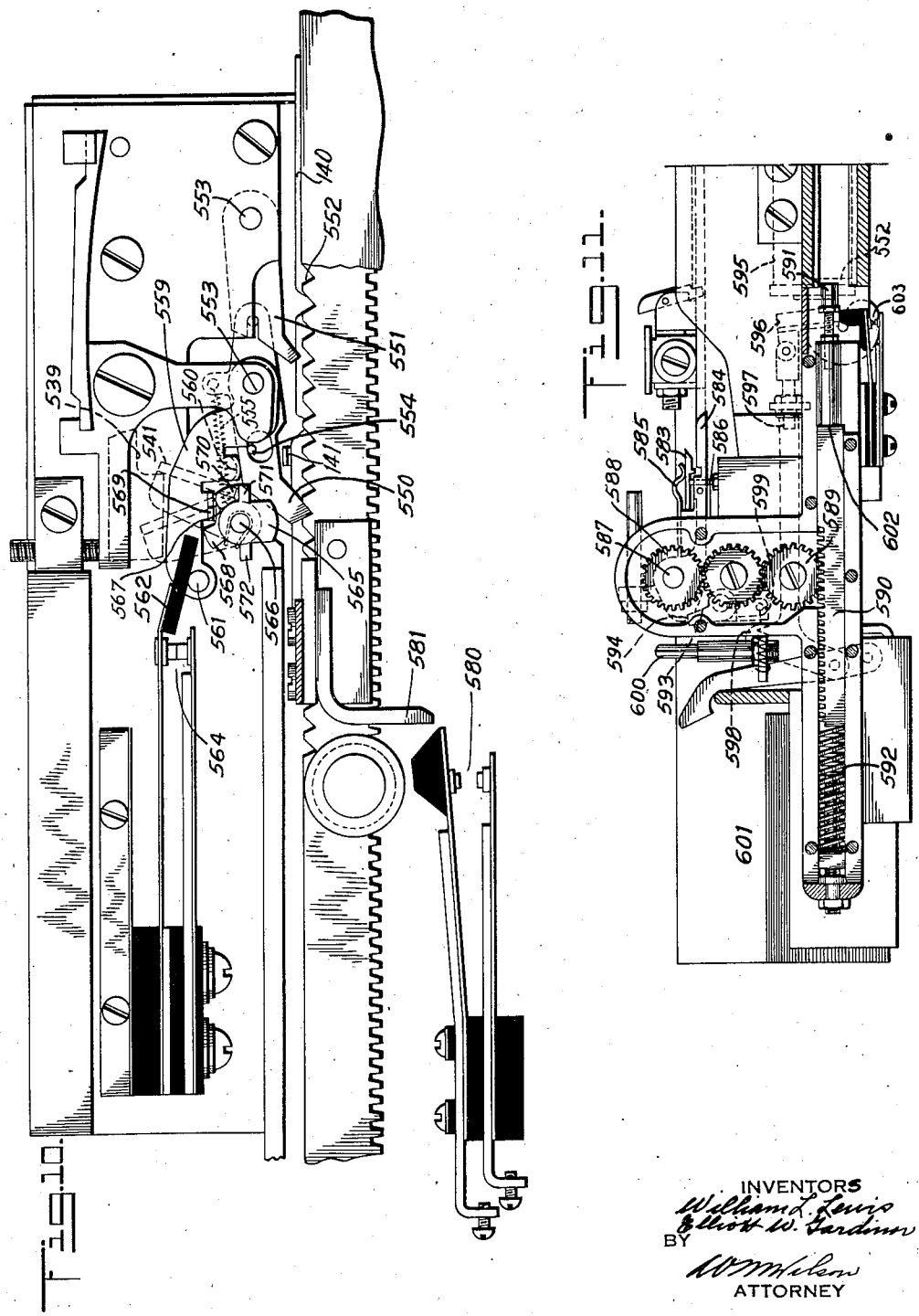

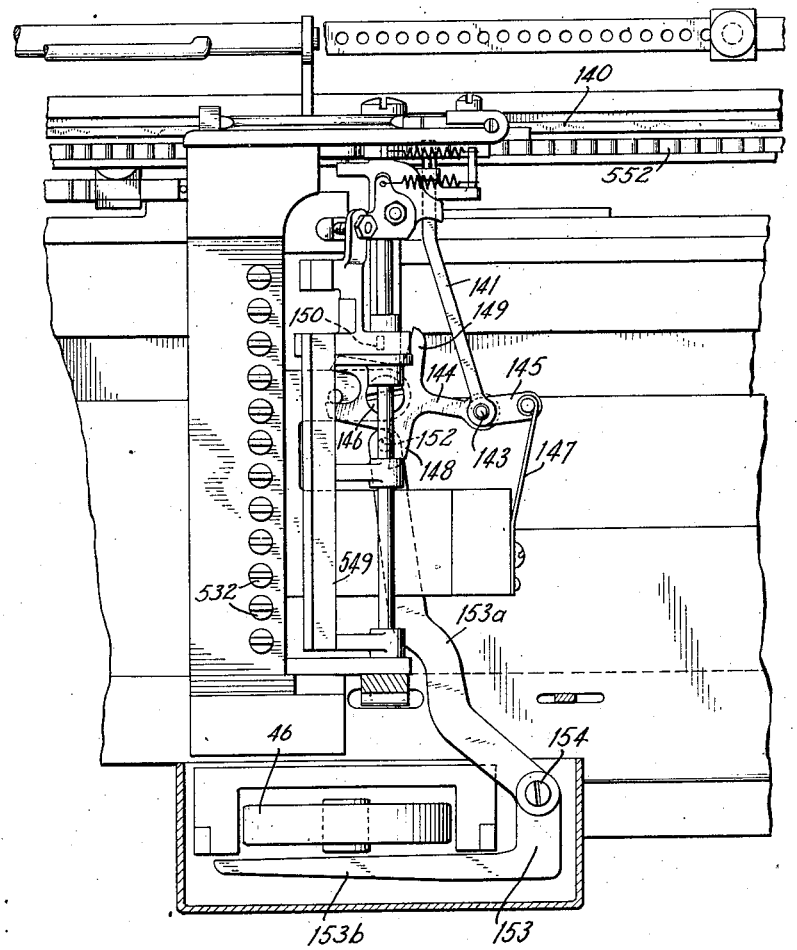

Dec. 7, 1943. W. L. LEWIS ET AL 2,335,949
PUNCHING MACHINE
Filed Aug. 6, 1941 13 Sheets-Sheet 10

INVENTORS
William L. Lewis
Elliott W. Jardinov
BY
W. M. Wilson
ATTORNEY

Dec. 7, 1943. W. L. LEWIS ET AL 2,335,949
PUNCHING MACHINE
Filed Aug. 6, 1941 13 Sheets-Sheet 11

INVENTORS
William L. Lewis
Elliott W. Gardiner
BY
ATTORNEY

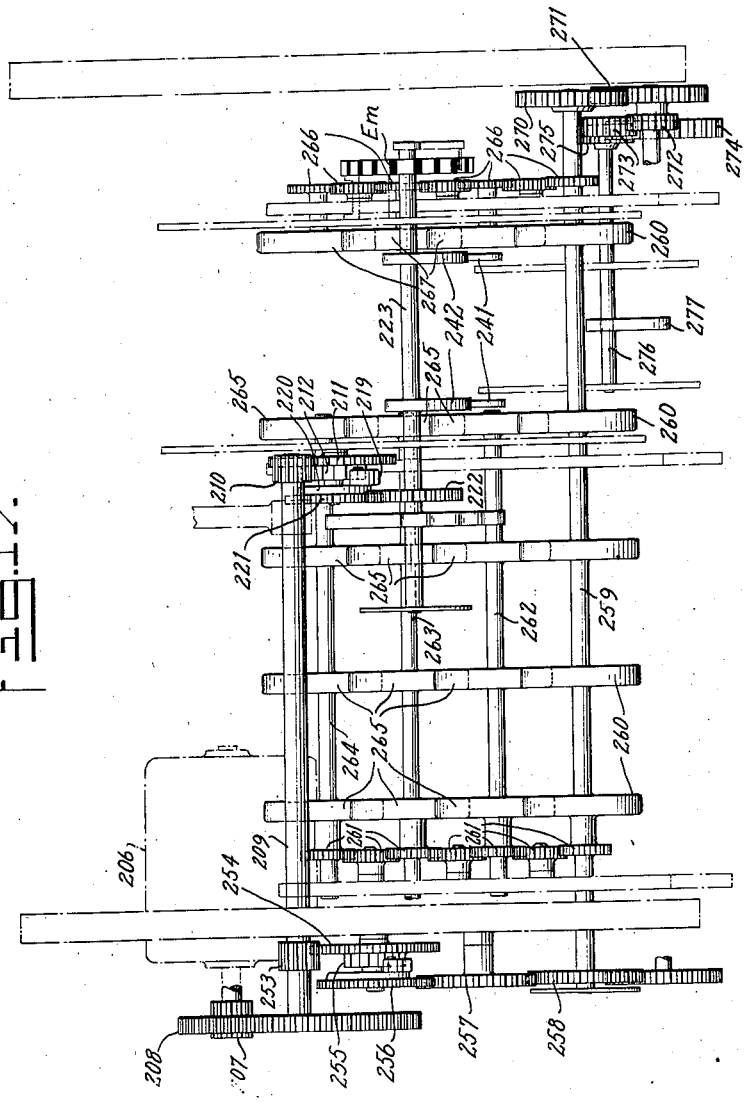

Patented Dec. 7, 1943

2,335,949

UNITED STATES PATENT OFFICE 2,335,949

PUNCHING MACHINE

William L. Lewis, Binghamton, and Elliott W. Gardinor, Conklin, N. Y., assignors to International Business Machines Corporation, New York, N. Y., a corporation of New York Application August 6, 1941, Serial No. 405,628

11 Claims. (Cl. 101—19)

This invention relates to punching machines and particularly to that type which has coordinated therewith a printing device which provides a printed record of the data punched.

The main object of the present invention is to coordinate a punching machine with a printing machine and further to provide storage means which stores up the data which has been punched and which is subsequently read out to control the printing instrumentalities of the printing machine.

The present invention is not restricted in its utility and may find wide applications in the novel combinations devised but the present machine has been devised particularly for utilization in accounting machines involving bank checks. The printing is applied to the back of the checks so as to determine overages or shortages in transmittal lists accompanying the checks which are to be returned to the paying banks.

One object of the invention is to punch a record to represent certain data derived from a check, such as a bank number represented on the face thereof and to also print the same bank number on the back of the check so that if a tabulating card is punched incorrectly, the check or card in question can be located by a comparison between the printed bank number on the face of the check and the number printed by the printing machine on the back of the check. By such recording, any discrepancy between bank numbers that were originally printed on the face of the check and on the back can be easily determined. The determination of such errors localizes them so that they can be quickly rectified, thereby increasing the efficiency of check accounting systems over that previously devised.

Another object of the invention is to prevent further operations of the punching machine unless the check involved in the punching operation is manually inserted in the check receiving chute of the printing machine.

An incidental object of the present invention is to employ a photoelectric circuit arrangement to sense the presence of a check in the printing machine, avoiding the use of mechanical operated card levers which may not be efficiently operated by thin sheets of paper, such as bank checks.

A still further object of the invention is to enable supplemental operations of the punching machine such as ejection of the punched card, the feeding of a new card to the punching machine, etc., only when the check to be printed has been inserted in the printing machine.

A related object of the invention is to lock the punch selecting keys against subsequent operation unless the check involved in the punching operation is inserted in the punching machine.

A still further object of the invention is to store up the key entered data to be printed on data storage means and to cause the storage means to set up printing wheels in the printing machine under control of the storage means in readiness to print the amount on the check when the latter is subsequently inserted in the chute of the printing machine. In this connection, the machine is so arranged that the completion of punching of the data to be printed will automatically cause the setting up of the printing wheels under control of the data storage means.

An incidental object but relatively important one is to cause the automatic feeding of the inserted check to the printing wheels when the punch has been completely operated and then effect the automatic operation of the printing platen when the check has been fed in coordinated position with the printing wheels.

Summarizing, the principal and subordinate objects of the present invention and the principal purpose of the invention, are to coordinate a punching and printing machine and to embody in each of the machines automatically operated mechanisms which will carry out the necessary functions in each machine without any attention on the part of the operator. The result of such construction is that all that the operator is required to do is depress the punch selecting keys and merely insert the checks to be printed in the chute of the printing machine. The novel coordination of such machines speeds up the operation thereof, enabling a high output in recording operations involving both printing and punching. By the provision of the novel interlocks hereinafter to be described, inter-related operations between the punching machine and the printing machine are enforced, eliminating accidental and misoperations of the machine. The result of such interlocks is to cause a check to be printed for each card punched, thereby providing the necessary correspondence between card punching operations and check printing operations.

A still further object of the invention relates particularly to the skipping mechanism devised for the punching machine. A feature which is of particular advantage is the incorporation of a skipping mechanism which will enable the skipping of the carriage from the last column of one field to a predetermined column of the next field, the columns which are skipped being those which would ordinarily be punched to represent zeros. This is performed in the usual manner by the depression of the "X" or skip key. By such means three columns of punching may be omitted in the present machine, thus saving the time of the operator by eliminating unnecessary punching.

It is frequently desirable that one of these three columns be punched to represent a single digit and upon such occurrence, the depression of the skip key would ordinarily cause a skip to the predetermined column and then cause the punch carriage to stop there. The single digit punched would ordinarily be followed by zeros which are not punched and a relatively important feature of the present machine is to cause the means which normally effects the stopping of the card carriage at the predetermined column to be ineffective and enable the carriage to be skipped beyond such column position.

An object of the invention is, therefore, to provide broadly means under control of the punch carriage to determine whether the carriage is to be skipped to the predetermined column position or automatically beyond such column position.

A still further object of the invention is to improve the skipping mechanism by causing an electromagnetic means to elevate the locking dog of the carriage escapement mechanism, and to provide an electromagnetic means to shift the skip lifter. The first preferably consists of the usual punch operating magnet which has considerable power, thus enabling the other electromagnet to be smaller since its only function is to shift the skip lifter arm which, in cooperation with the skip bar, keeps the dog elevated after it has been raised by the punch magnet.

Other objects of the invention will be pointed out in the following description and claims and illustrated in the accompanying drawings, which disclose, by way of example, the principle of the invention and the best mode, which has been contemplated, of applying that principle.

Figure 4:
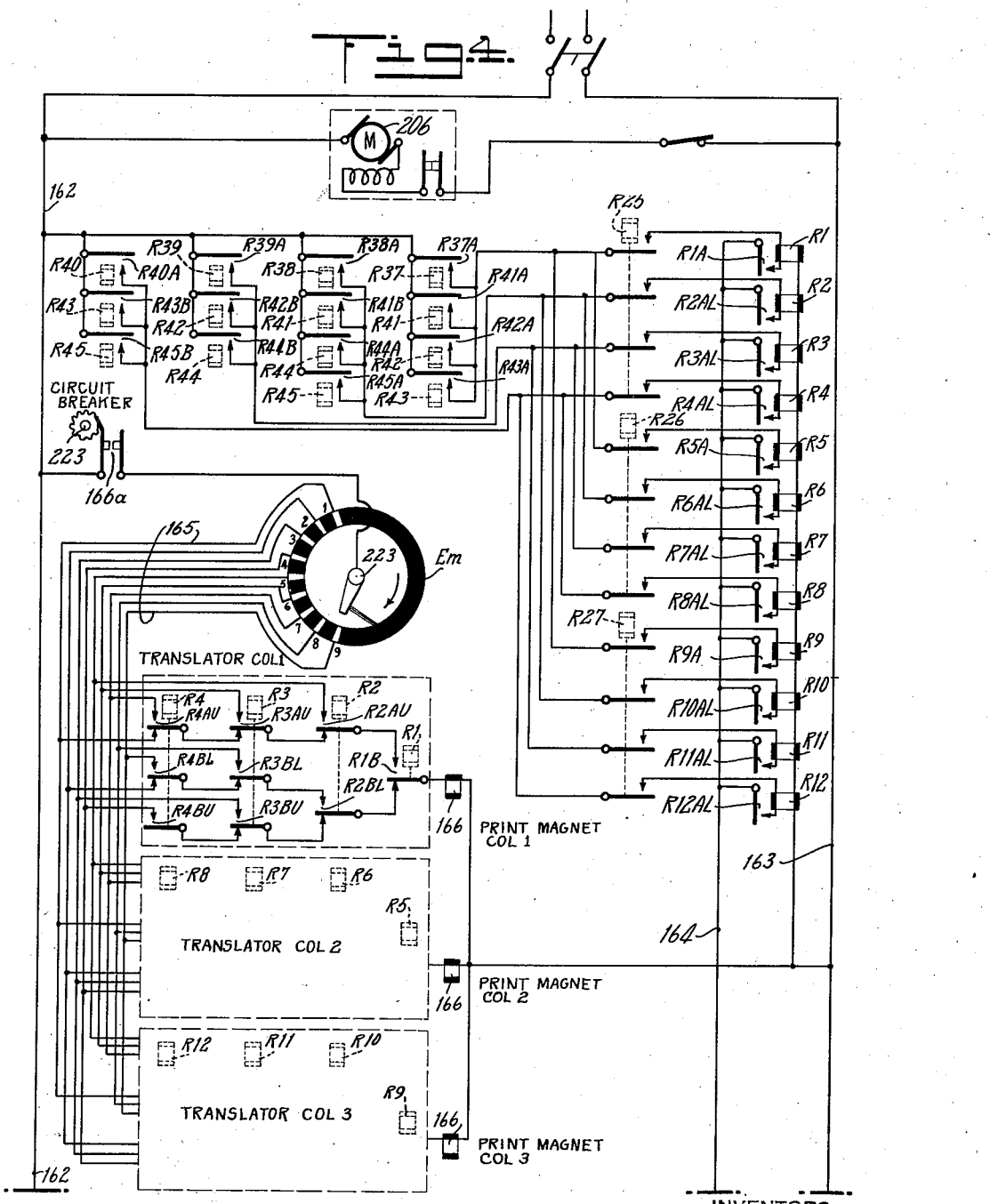
Figure 5:
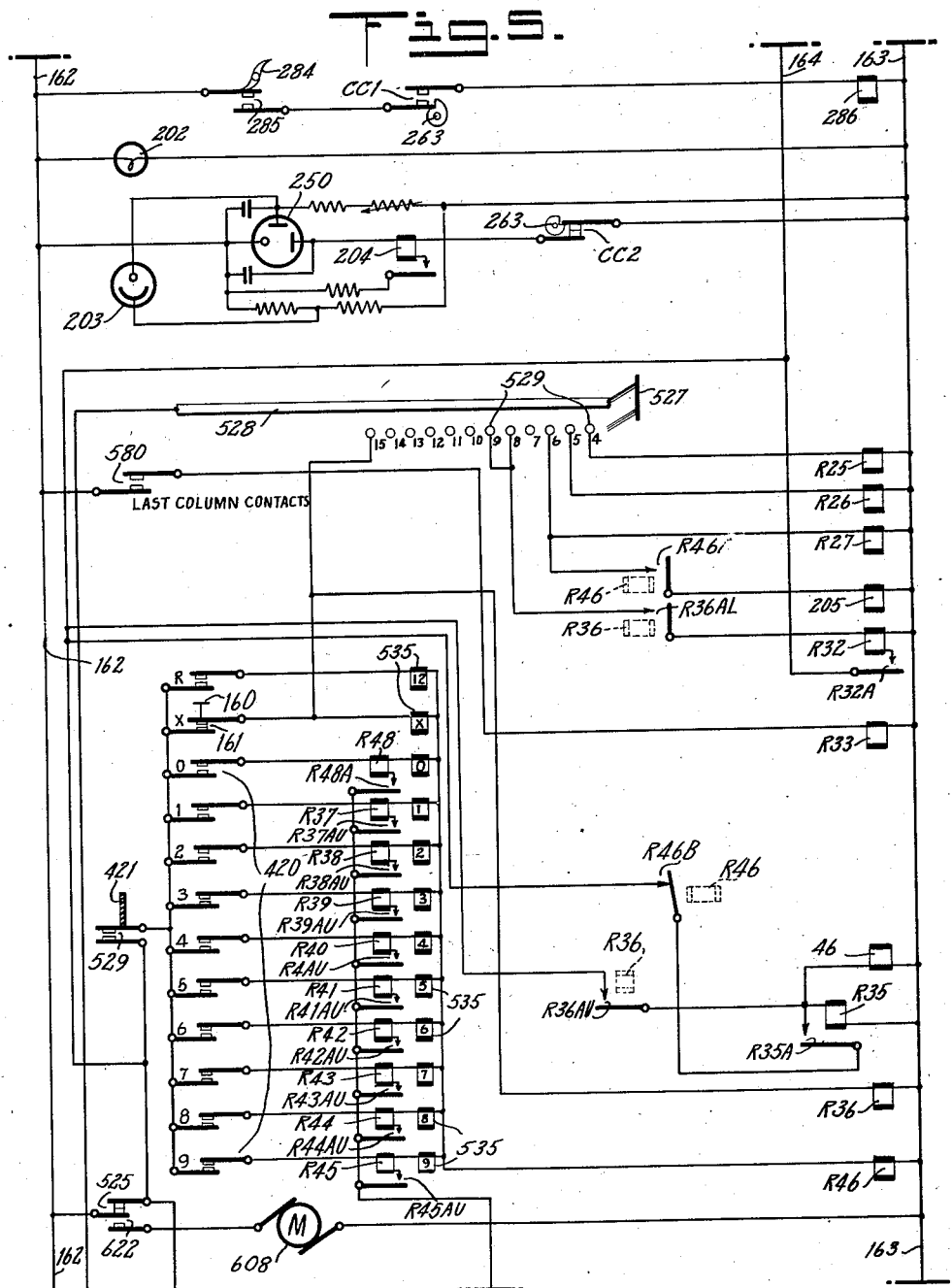

Figs. 4, 5 and 6 when assembled with Fig. 4 on the top, Fig. 5 in an intermediate position, and Fig. 6 at a bottom position illustrate the wiring diagram for the machine.

Fig. 6a is a diagrammatic view showing the electrically controlled lock system for the punch selecting keys.

Fig. 6b is a code showing the particular relays energized upon depression of the punch selecting keys.

Fig. 6c is a timing chart of the cam operated contacts employed in the wiring diagram, card levers, hammer operating cam, etc.

Fig. 7 is a plan view of the preferred form of punching machine.

Fig. 8 is a front view of the punching machine broken away to show certain interior parts.

Fig. 9 is a longitudinal sectional view of the punching machine on an enlarged scale.

Fig. 10 is a detail view illustrating certain contact making mechanism of the punching machine controlled by the escapement mechanism and also controlled by the card carriage.

Fig. 11 is a view in side elevation of the left hand of the punching machine showing the card ejecting mechanism therefor.

Fig. 12 is a plan view showing the electromagnetic control of a conventional form of carriage skipping mechanism.

Figure 13:
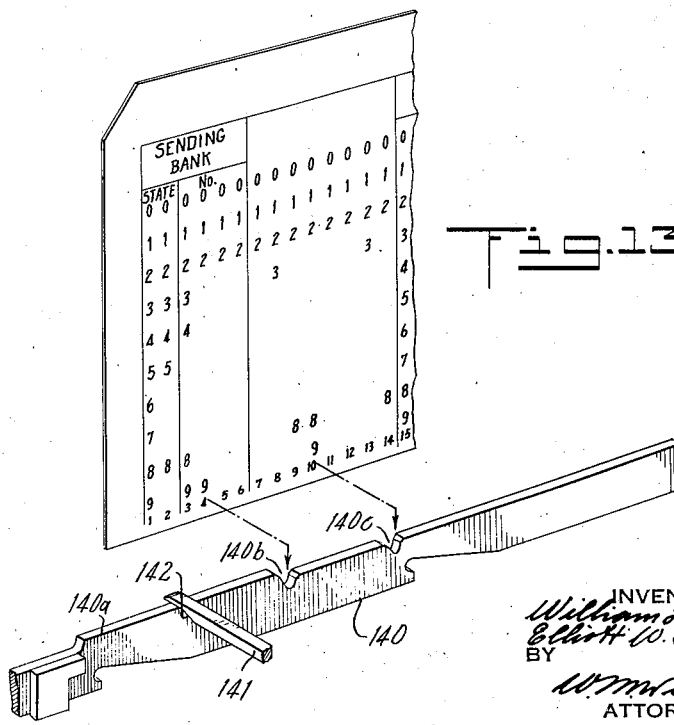

Fig. 13 is a diagrammatic view showing the inter-relation of the tabulating card and the skip bar of the skipping mechanism, clearly illustrating the formation of the skip bar for the form of card selected.

Figure 14:
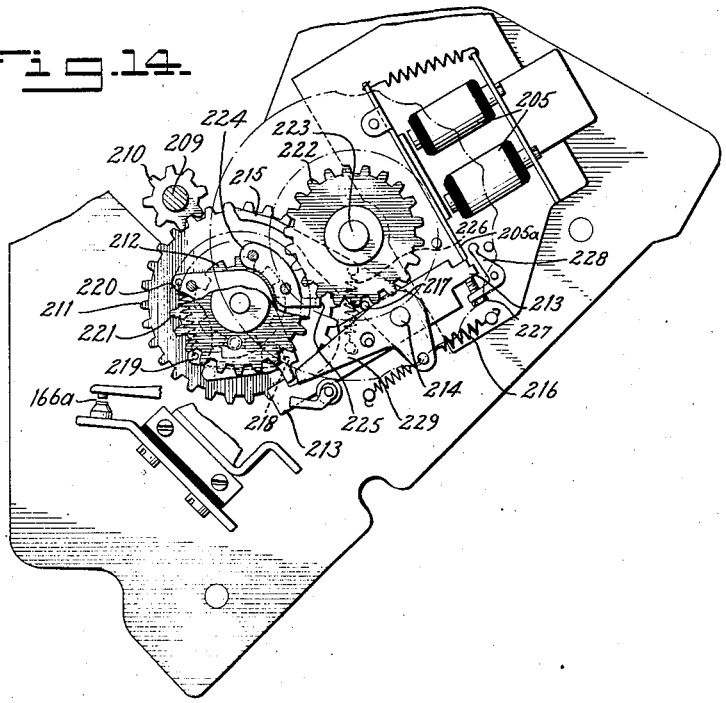

Fig. 14 is a detail view of the clutch which is engaged to set printing wheels of the printing machine.

Figure 15:
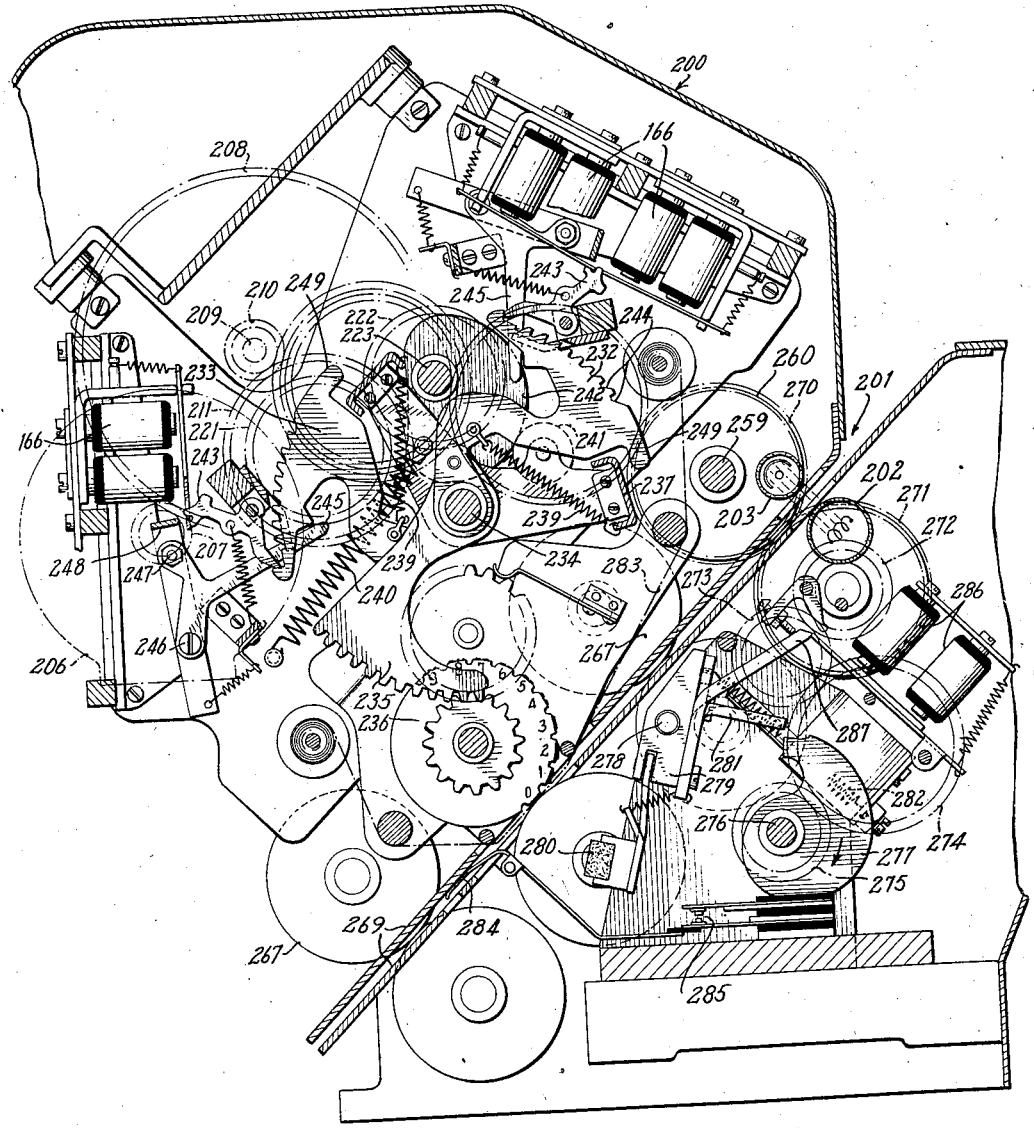

Fig. 15 is a sectional view of the printing machine showing the printing wheel setting mechanism.

Figure 16:
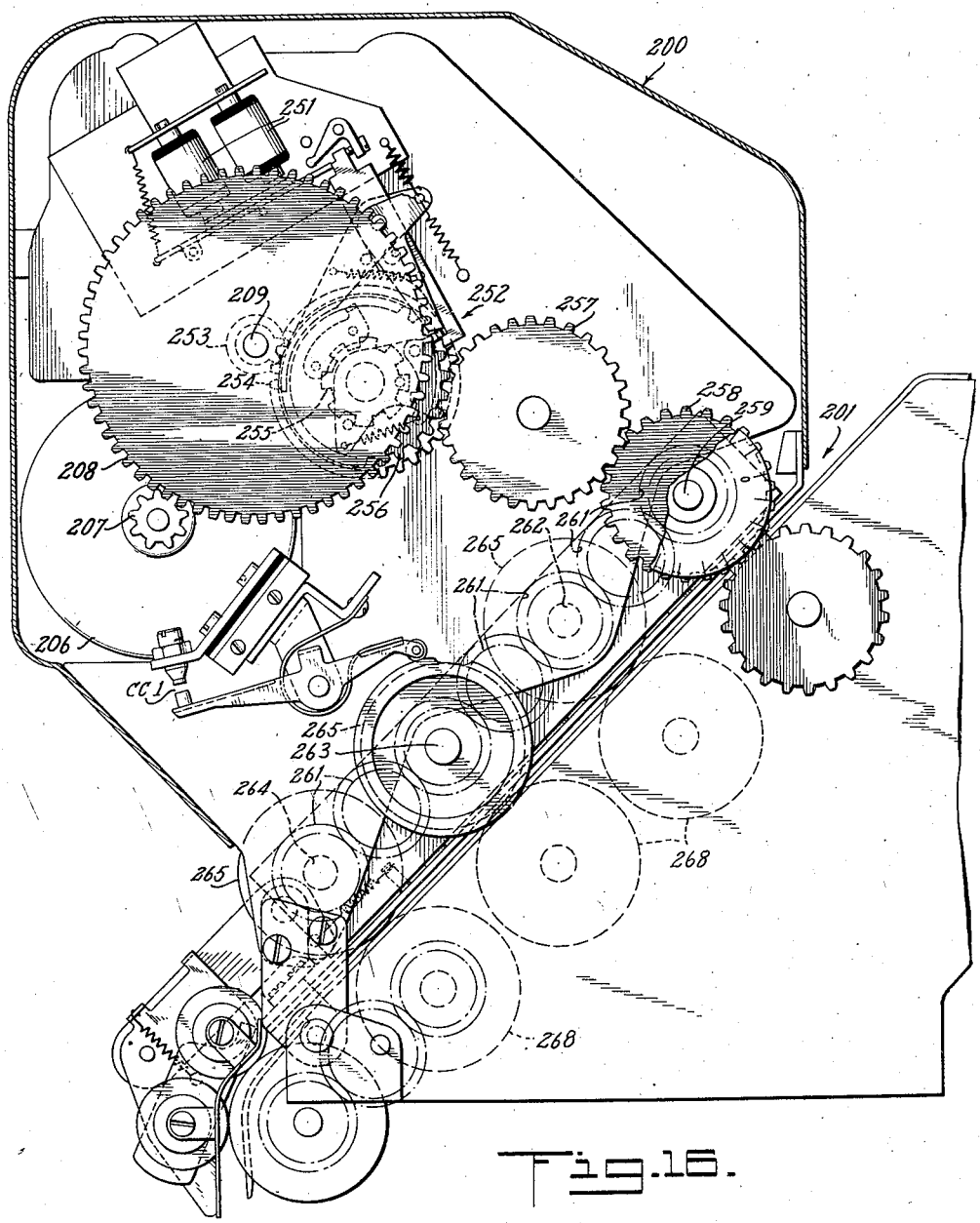

Fig. 16 is a view in side elevation of one side of the printing machine showing the check feeding rollers.

Fig. 17 is a plan view showing the intergearing and controlling clutches.

PURPOSE OF ARRANGEMENT

The purpose of the combined punching machine and printing machine is to aid in the discovery of errors which would be likely to be made in accounting operations which involve the hand sorting of bank checks. It is well known that a bank receives a number of checks which are drawn upon different banks and these checks are manually sorted according to the names of the paying banks and which are identified on the face of each of the checks by a significant bank number. By manual sorting of the checks, the sorted groups are utilized to make tabulated lists of the amounts of the checks of each classified group, which has previously been performed by the use of a conventional adding machine. It is evident that an error in sorting would produce a transmittal list of the amounts of checks of the same classification which would be incorrect. It is for the purpose of eliminating the possibility of such errors and also to facilitate the location if these errors have been made and to enable transmittal lists to be made by a tabulating machine that the present combination of machines has been specifically devised.

Figure 2:
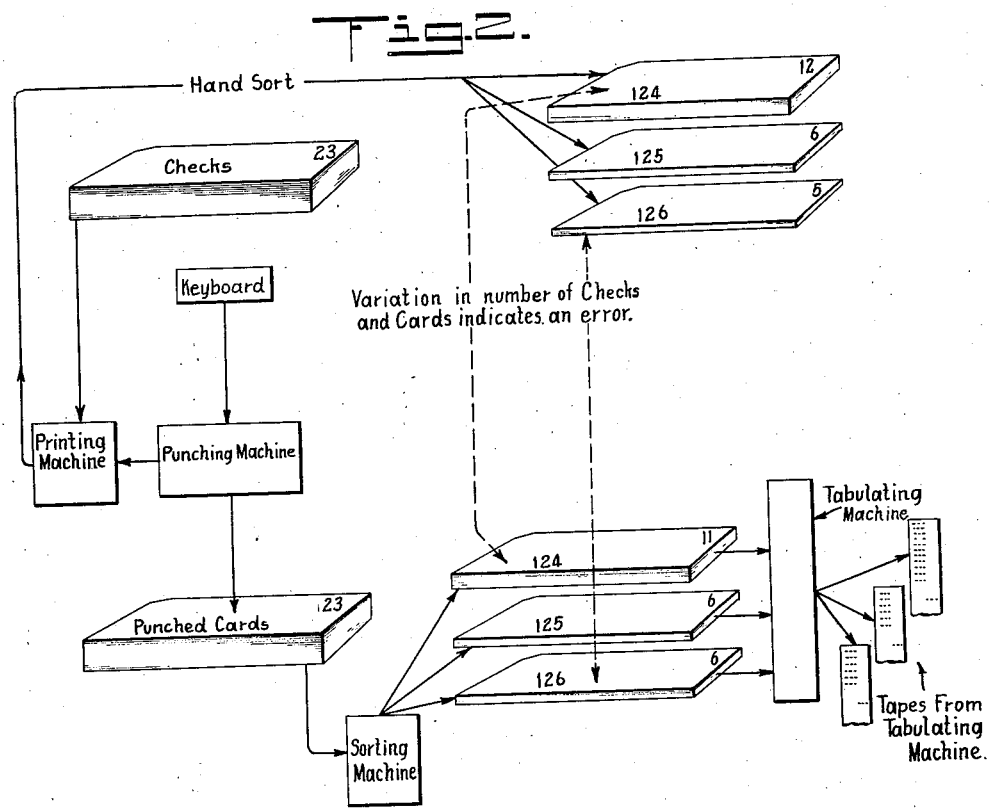
Fig. 2 is a diagram illustrating the accounting system involving the present punching and printing machines and is provided to illustrate the utility of the coordinated machines for one form of accounting systems.
Figure 3:
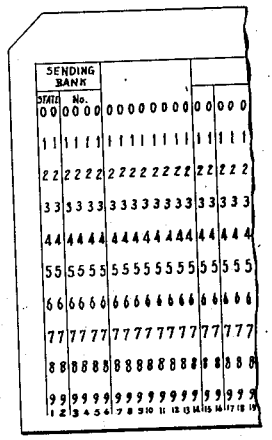
Fig. 3 is a fragmentary view of the tabulating card which is punched by the punching machine.

In Fig. 2 there is diagrammatically outlined the accounting procedure in which the present combination of machines is involved. It will be assumed that the clerk has received twenty-three checks which have been drawn upon three different banks having different names and which are identified by the classification numbers 124, 125 and 126. Before these checks are sorted by hand, according to their classification numbers, cards are punched to represent the amounts of the checks and also the classification numbers of such checks. The classification numbers perforated upon the cards are also printed on the back of the checks so that for a group of numbered checks, there is a group of punched cards correspondingly numbered. By sorting machines of a well known type, the punched cards are sorted according to their classification numbers and, if so desired, a sorting machine provided with a counting attachment may be utilized so as to count the number of cards sorted in each group.

The next accounting procedure is the production of transmittal lists made by a conventional tabulating machine. The tabulating machine produces an itemized list which contains the classification number of each check and also the amount of each check, a separate list being provided for each group of punched cards. The list will also bear a total representing the total of the amounts of the checks of each group and, if so desired, may also represent the total of the number of cards or checks in each group.

The original checks are also sorted out by hand and the sorting operation is carried out in accordance with the names of the banks printed on the face of the checks or, if the operator so desires, in accordance with the number originally printed on the face of the checks. The operator will, of course, not utilize the number printed on the back of the check for this sorting since the latter is only for purposes of locating errors. If no errors have been made in sorting the checks by hand and also in punching the tabulating cards for each sorted group of checks, there will be a number of items on the transmittal list corresponding to the number of checks of the related group. Referring to the diagrammatic representation, the operator has sorted six checks from class 125 and the corresponding list bears six items with a total which was derived from the six tabulating cards punched with the classification number 125.

However, for the group of checks numbered 124, the operator has twelve checks but the itemized list only contains eleven items derived from the eleven cards of the group numbered 124. Also for the group 126 there are five checks, whereas there are six items listed upon the transmittal list. This indicates a discrepancy and shortage in one group and an overage in another group.

The operator then takes the group of checks 124 and compares the bank number on the face of the check with the bank number printed upon of the back of the check and will locate a check which is printed with the number 126 on the back of the check instead of 124 which is correct and on the face of the check. This indicates that the card was incorrectly punched with the number 126 instead of 124 and thereby indicates an overage in this group and correspondingly a shortage in the 126 group. By such identification and comparing of all bank numbers, errors may be quickly located and all that is necessary thereafter is for the operator to punch tabulating cards which are correctly identified as to the bank numbers. When the discrepancies in the different groups have been corrected by properly punching tabulating cards, new lists may be obtained which will correspond with the number of checks manually sorted. Generally, the machine consists of a punching machine in which the bank numbers and related amounts are set up so as to punch a tabulating card with this data. The bank numbers are set up on printing wheels of a printing machine so that the check inserted thereto may be printed upon the back thereof with the number punched upon the tabulating card. Certain interlocks are provided which require the printing upon a check for each tabulating card punched so as to keep the number of checks and number of punched cards in correspondence. The machine also includes a specific form of skipping mechanism to avoid the necessity of punching certain columns when such columns are not required to be punched due to the small amount of the check, and to eliminate punching of zeros to the right under certain other circumstances.

CARD PUNCHING MACHINE

The card punching machine herein illustrated is of the type shown in the patent to Fred Lee and George Daly, No. 1,976,618, dated October 9, 1934, and only so much of the operation thereof will be explained as is necessary for an understanding of its operation in connection with the present invention.

In general, the punching machine contains a feed magazine 530 (Figs. 7, 8, and 9) from which the cards are fed singly from the bottom of the magazine by a picker 531 (Fig. 7) which feeds the cards to a position under the punches 532 (Fig. 9) and in the present machine, the carriage escapes to present the fourth column of the card to the punches preparatory to receiving the perforations effected by the first manual punching operation. From this position, the card is engaged at its rear edge by a pusher 534 mounted upon an escapement rack 552 (Fig. 9), which, for each operation of the punches, permits the advance of the card step by step. A series of magnets 535 is adapted to select the punches 532 for actuation in the following manner: Associated with each magnet 535 is a pivoted armature 536 whose free end is connected to a rod 537 which, through a bell crank 538, moves an interposer bar 539 to the left in Fig. 9 where it cooperates with a punch bar or plate 540. The forward movement of the interposer bar 539 is adapted to rock a bell 541 pivoted on a rod 566 and which in Fig. 8 is shown as connected to a spring pressed depending link 542 whose lower free end is adapted to engage and close contacts 543. This, as shown in Fig. 5, closes a circuit from the line 162 through contacts 525 now closed, through contacts 543 (Fig. 6), through the magnet 544 to the line 163. The energization of the magnet 544 will then attract its armature 545 and through a link and bell crank connection 546 (Fig. 8) will draw downwardly on the pivoted punch bar or plate 540 to force the selected interposer against the associated punch, thus perforating the card.

The selection of the magnets 535 for effecting the punching operations is under control of a series of keys 419 which close contacts 420 (Figs. 5 and 6a) and preferably such keys are mounted in a keyboard separate from the usual keys (see Fig. 1) of the punching machine so that punching operations may be controlled at a location away from the punching machine. The keys are shown diagrammatically in Fig. 6a and consist of pivoted members which are rocked upon the depression of the key cap so as to close the related key contacts 420. Underlying each of the keys and operated thereby is a bail 421 which, upon a key depression, is adapted to close contacts 529. Upon a depression of any key, the bail contacts 529 are closed and then the contacts 420 are closed by the depression of a key to thereby extend a circuit from the line 162 through contacts 525, thence through contacts 529, and through the related key operated contacts 420 to one of a series of relays R37 to R45 and R48, inclusive and thence to a related punch selecting magnet 535, then through a relay magnet R46 to the line side 163. For example, the punch magnet 535 for punching the digit zero is energized as well as its related relay R48 when the zero key 419 is operated to close its contacts 420. (See table, Fig. 6b.)

Under control of the keys 419, the aforesaid relays will be selectively energized and each will close its related stick contact AU or A and the stick circuit will thereupon be extended from the line 163 through the relay magnet R46, the selected relay R37 to R45 and R48, its associated stick contact and then via a line to relay contacts 47AL (Fig. 6) now shifted and then through the contacts 525 back to the line 162. Referring to Fig. 6, numeral 564 designates contacts which are in the punching machine as shown in Fig. 10, and it will be observed are normally closed. The normal closure of the contacts 564 closes a circuit from the line 162 (Fig. 6) through the contacts 564 and then through a relay magnet R47 to the line 163. Since contacts 564 are normally closed, the contacts R47AL will normally be shifted to extend the stick circuit just described to the line 162. As will subsequently be described, the contacts 564 are then opened and remain open until the punch carriage moves to the next column position and the opening of contacts 564 will thereupon break the stick circuit to the selected relay and the associated punch magnet 535. This will enable the punch operating parts of the punching machine to be returned to normal position independently of the control of their operation by keys 420.

It is, of course, desirable that a subsequent key operation be prevented until the punch has completed its punching operation for a column and then skipped to the next column position. Referring to Fig. 6a, a locking mechanism for the keys is diagrammatically shown and consists of a plurality of fingers 432 which are secured to a rock shaft 433 and to said rock shaft 433 there is connected an armature 434 of a key lock magnet 435. In the normal position of the fingers 432 they are out of locking operation with studs 436 carried by the key levers 420. From Fig. 6 it will be noted that a circuit is extended from the line 162 through contacts 525, thence through contacts R47AL to the magnet 435 to the line side 163. It will be recalled that the opening of contacts 564 will deenergize the relay magnet R47 to allow its contacts R47AL to come to a normal position, thereby causing the energization of the key lock magnet 435 to lock the keys and such locking will be effected until contacts 564 again close when the punch carriage has been spaced to the next card column position. This will prevent successive operation of the keys 420 to prevent misoperations of the punching machine. When the card carriage has skipped to the next column, contacts 564 then close to cause the energization of the relay magnet R47 and by the shifting of its contacts R47AL effect the deenergization of the key lock magnet 435. The keys are now free for a subsequent operation.

ESCAPEMENT MECHANISM

When the bar 540 is depressed in the foregoing fashion, the left end of the selected interposer will, of course, be depressed thereby rocking a bail 549 pivoted on a shaft 553 in a counterclockwise direction (Fig. 9) to raise an escape dog 550 (Fig. 10) and depress a locking dog 551 into engagement with the escapement rack 552, the relation of the dogs being such that the locking dog 551 engages a tooth in the escapement rack 552 before the dog 550 becomes fully disengaged from said rack. The dog 550 is pivotally mounted upon an extension of a shaft 553 and has a slot, the left end of which abuts said shaft. Said dog also has an enlarged hole cooperating with a pin 554 fixed to a short arm carried by the shaft 553 and is normally spring urged toward the left by a spring 555 interposed between a fixed part of the frame and a tail formed in the dog.

When the shaft 553 is rocked by the bail 549, the arm fixed on said shaft carrying the pin 554 will be rocked clockwise (Fig. 10) to raise the dog 550 and disengage the nose of said dog from the rack, prior to which, however, the locking dog 551 will engage a tooth of the rack. As soon as the nose of dog 550 clears the tooth of rack 552 which the dog engages, the spring 555 will draw the dog 550 to the left so that the nose of said dog will overlie the space between the next adjacent tooth to the left of the one in which the nose of said dog formerly engaged.

When the magnet 544 is energized, a projection 556 (Fig. 8) extending upwardly from and carried by the link 546 urges the lower end of the link 542 to the right so that about the time the armature 545 reaches the limit of its movement to the right, the link 542 will become disengaged from one of the spring contact members carrying the contacts 543 so as to permit said contacts to open immediately, thereby deenergizing the magnet 544 which will then release its armature, allowing a spring 557 (Fig. 9) to rock the plate 540 upwardly and permit the selected interposer 539 to rise and thereafter be restored to normal position by means of a spring 558.

As a consequence of the deenergization of the magnet 544, the bail 549 will rock clockwise to its normal position shown in Fig. 9 and the dog 551 (Fig. 10) will be raised to release the rack 552 which will then move one column space to the left by the usual spring barrel. Since the dog 550 overlies the interdental space between the next two adjacent teeth to the left, said dog will ride into said space and prevent the rack 552 from escaping more than one tooth space which corresponds to the distance between columns of the record card.

It will thus be seen that each time one of the punch selecting keys is depressed, one of the magnets 535 will be energized, and will select a punch 532 for operation, the punch selected corresponding, of course, to the particular key depressed.

As previously stated, it is desirable that the stick circuits through the relay R46 (Fig. 5), the magnets 535 and through the selected relay R37—R45 and R48 be broken after the magnet 544 has been energized to operate a selected punch and that said stick circuits remain open until the carriage has completely escaped one column space so that premature energization of another magnet 535 may be prevented. For this purpose, there is provided mechanism illustrated in Fig. 10 and which is fully shown and described in the patent to W. F. Gutgesell, No. 1,939,049.

Pivotally mounted on the rod 553 adjacent the dog 550 is a member 559 having a lug 560 overlying the upper edge of the dog 550 so that when said dog is raised by the pin 54 as described, the member 559 will be rocked clockwise. The member 559 has a pin 561 underlying a block of insulating material 562 carried by a spring contact member of contacts 564 which are mounted upon and insulated from a fixed part of the frame. The contacts are so disposed that when in the position shown in Fig. 10, they will be closed by engaging each other. When the dog 550 is raised by the pin 554 by consequence of the rocking of the bail 549 counterclockwise (Fig. 8), the member 559 will be rocked clockwise (Fig. 10), thereby raising the pin 561 and opening the contacts 564 to break the circuits closed therethrough.

In order to hold the contacts 564 in contact with each other until the carriage has fully escaped, there is provided mechanism controlled by the rockable bail 541 which holds the pin 561 in elevated position until the dog 550 has been rocked back into engagement with the next adjacent tooth in rack 552. This mechanism comprises a T-shaped member 565 fixed upon the shaft 566 upon which is fixedly mounted the bail 541.

Pivotally mounted on the shaft 566 in a spring operated member 567 having a lug 568 which normally engages the left side (Fig. 10) of a transverse lug 569 formed in the member 559. The member 567 is normally in the position shown in Fig. 10 with its coiled operating spring holding a bent-over lug 570 in said member in engagement with a lug 571 formed in the T-shaped member 565, the coil spring operating the member 567 being interposed between a lug 572 in the member 565 and the left edge of lug 568 in member 567.

When the bail 541 is rocked counterclockwise, due to the leftward movement of one of the punch interposers 539 (Fig. 9), the T-shaped member 565 will be rocked clockwise as in Fig. 10 but the lug 568 will be held by the lug 569 and prevented from movement as a consequence of which the coil spring interposed between the lugs 572 and 568 will be tensioned. After the bail 541 has rocked far enough to close the contacts 543 the magnet 544 will be energized, thereby rocking the bail 549 and shaft 553 in a clockwise direction as shown in Fig. 10 to raise the dog 550 and rock the member 559 clockwise.

As a consequence of this movement the lug 569 will be carried upwardly and will clear the lug 568 which, it will be remembered, is held stationary by the lug 569 during the rocking of the bail 541, as described, so that the coil spring between lugs 572, 568 will cause the lug 568 to snap under the lug 569 and prevent the member 559 from being restored when the dog 550 rides down into the next tooth space to the left (Fig. 10) and will be held in this position until the bail 541 is restored to normal position (Fig. 9).

As a consequence of the deenergization of the punch magnet 544, the bail 549 will rock clockwise (Fig. 9) and the selected interposer 539 will be restored by its spring 558, thereby permitting the bail 541 to rock back to its normal position as shown in Fig. 9.

The lug 568 is so proportioned that it will not clear the lug 569 in member 559 until the bail 541 has reached its home position. Consequently, the contacts 564 cannot reclose until bail 541 has been permitted to return to its normal position, which, of course, will not happen until the selected interposer has likewise returned to its normal position. The contacts 564 are connected in the circuit to the relay R47 (Fig. 6) so that it will be clear that the relay R47 shifts its contacts R47AL to energize the key lock magnet 435 to lock the keys during the period in which the contacts 564 are open.

COLUMN SELECTOR

The column selector for punching comprises the movable contact brush 527 (Fig. 9) carried by the punch carriage and engageable with a reading strip comprising a common contact strip 528 and contact points 529 (see also Fig. 5) certain of which are connected to cause certain functions to be performed when the carriage is at certain column positions in a manner to be subsequently explained.

For further details of the construction of this column selector, reference may be had to the patent to G. F. Daly et al. No. 2,016,706, dated October 8, 1935.

CARRIAGE SKIPPING MECHANISM

The particular operation of the skipping mechanism as it is utilized in connection with the present invention will be subsequently described in detail. At the present time it should be noted that, upon the completion of punching of the amount on a card, there is an automatic skipping of the card carriage to the last column position. At this last column position of the punch carriage, contacts 580 (Fig. 10) will be closed by means of a projection 581. As long as the punch carriage is in its last column position, contacts 580 are closed. Referring to Fig. 5, the closure of the contacts 580 will connect relay R33 across the lines 162 and 163 and with particular reference to Fig. 6, the energization of relay R33 will close its contacts R33A, thereby extending the circuit from line 162 through relay contacts R33A and thence through contacts 204C which are now closed in a manner to be subsequently described in detail, thence through the card ejecting control magnet 595 to the line 163.

The present machine is also provided with a card ejecting mechanism and a power driven card feeding mechanism so that a new card is fed to the carriage after the punched card has been ejected. These mechanisms are also well known in the art and are shown in the patents to Lee and Daly, No. 1,976,618; F. M. Carroll, No. 1,976,600; and H. L. Read, No. 1,962,750, and for this reason are only generally explained herein. The card ejecting mechanism is shown in Fig. 11 and is set into operation by the energization of the card ejecting control magnet 595 by the circuits just outlined in detail.

The operation of the card ejecting mechanism is described as follows:

CARD EJECTING AND CARRIAGE RETURN MECHANISM

Stated generally, the gripper comprises a pair of jaws 583 and 584 (Fig. 11) urged together by a flat spring 585 but the abutment of a pin 586 with the upper jaw 583 separates the jaws in order that the punched card may be received by the slit-like separation. The card occupies a position between the jaws at the termination of the skipping of the carriage to the last column position.

The gripper is pivotally mounted on a shaft 587 to which is secured a gear 588 adapted to be driven by a gear 589 through an idler gear. Meshing with gear 589 is a slidably mounted rack 590, the extremity of which terminates in an adjustable cylindrical plunger 591. During the previous restoration of the card carriage, the end of rack 552 engages plunger 591 to shift rack 590 to the left against the tension of a spring 592. This caused a clockwise movement of shaft 587 through the train of gears 588—589 to bring the gripper unit to the position shown in Fig. 11, whereupon a latch lever 593 engaged a shoulder 594 of the lower jaw 584. Incidentally, a certain amount of compression was stored up in spring 592. Shifting of latch 593 is effected by energization of the magnet 595 which attracts its armature 596 when the magnet is energized. This causes a shifting movement of a link 597 to the right and by means of a cam shoulder 598 an arm 599 secured to the pivot shaft of latch 593 will rock the latter.

This will result in the release of spring 592 to cause the counterclockwise rotation of the gripper unit. As the jaw 583 leaves pin 586 spring 585 will act to close the jaw 583 upon the lower jaw 584 thus securely gripping the card and flipping the same in reversed position. A stationary pin 600 may suitably coact with one of the jaws to separate them, permitting the released card to fall into a receptacle 601. As the card is ejected, shifting of rack 590 by spring 592 will cause a square shoulder 602 to engage and close contacts 603. Since contacts 603 are now closed as well as relay contacts R33A, it will be seen from Fig. 6 that a circuit will be completed to a clutch control magnet 604 to energize the latter.

It will now be made clear that after the card has been ejected, the motor restoring mechanism will be set into operation to automatically restore the card carriage without attention of the operator.

In Fig. 7 the picker 531 is connected to a rack 607 (Fig. 8) which is actuated to the left to introduce a new card from the magazine 530 to punching position. Secured to the underside of the base of the machine is a motor 608 (see Fig. 9) having a coupling connection to a stud shaft 609 to which is secured a worm 610 meshing with a worm wheel 611 secured to a shaft 612 one end of which has secured thereto a ratchet-shaped clutch element 613 (Fig. 8). Loosely mounted on shaft 612 is a gear 614 meshing with teeth on the underside of rack 607 and to which gear is secured a disk 615. Pivoted upon the disk 615 is an arm 616 having a single clutch tooth. The free end of arm 616 is connected by a link to a toggle plate 617, the end of the toggle plate distant from its pivot being articulated to a rod 618, slidably mounted in a member 619a pivoted upon the disk 615. The parts are spring held in the position of Fig. 8 which they occupy normally. By virtue of this construction, rod 618 and plate 617 act as a toggle, the spring acting to impositively hold the tooth of arm 616 in or out of engagement with the clutch teeth of ratchet wheel 613.

For the purpose of effecting the clutching action, the magnet 604 is provided and when energized attracts an armature 619 so that an arm 620 (Fig. 8) engaging the pin 621 of arm 616 will rock the tooth thereon into engagement with ratchet wheel 613. Through the connecting link the toggle connection will be moved centrifugally to its other position wherein the spring on rod 618 will act to hold the clutch tooth in engagement with the ratchet teeth. Gear 614 will thereupon be driven in a counterclockwise direction substantially a single revolution, shifting rack 607 to the left to feed a new card to the punch carriage. This will similarly result in moving the card pushers and fingers to control the positioning of the cards.

At the termination of the counterclockwise movement of gear 604, a tail 622a (Fig. 8) will strike a projection 623 of a fixed plate to effect the disengagement of the arm 616 and ratchet wheel 613 by a reverse action.

Also secured to the pivot of armature 619 is an arm 624 (Fig. 9), the free end of which is adapted to bear upon an insulating block to open contacts 525 when magnet 604 is energized. Contacts 525 are retained open by a latching bell crank 625 which is adapted to be struck by bent-up plate 626 secured to gear 614 at the termination of the driving movement of the latter. Below contacts 525 are motor-control contacts 622 which are latched closed upon energization of magnet 604 to complete the motor circuit to motor 608 (see Fig. 5) and are unlatched to stop the motor at the termination of the driving operation in the manner just described.

SKIPPING MECHANISM

Skipping to initial card column position

The present punching machine is provided with a skipping mechanism of the type shown in the patent to Schaaf, No. 1,426,223, dated August 15, 1922, with modifications thereof to adapt the machine for specific skipping operations. The skipping mechanism includes a skip bar 140 (Figs. 10, 12 and 13) removably mounted upon the escapement rack and provided with suitable notches and cam surfaces which cooperate with the usual skip lifter arm 141 which has a beveled edge 142 (Fig. 13). By suitable means to be subsequently explained, the skip lifter arm 141 is moved rearwardly as viewed in Fig. 13 so that the beveled end 142 thereof will cooperate with the upper edge of the skip bar 140 to raise the end of the lifter.

The end of the skip lifter lies underneath the stepping dog 550 (Fig. 10) and upon being cammed upwardly elevates the dog 550 so as to be disengaged from the teeth of the escapement rack 552. This will release the carriage so that by the well known carriage moving means, the latter will move until the skip lifter arm 141 drops into a notch 140b or 140c of the skip bar 140 and the dog 550 will now drop into engagement with one of the teeth of the escapement rack 552 and interrupt further movement of the card carriage beyond the column position delimited by the notch 140b, or 140c in the skip bar. The function of the skip bar is to skip over the columns or fields which are not to be punched and the spacing of the cam portions and notches and the length of each portion is dependent upon the particular requirements of the punching job. Fig. 13 outlines the correlation between the card to be punched by the present machine and the skip bar 140 and shows in detail the necessary formation to permit skipping for the problem assumed.

It was previously indicated that upon the automatic return of the punch carriage, the latter automatically moves to the fourth column position so that the initial punching operations commence with this particular column. In the card utilized, the first two columns represent data which is common to a series of cards and each card is therefore prepunched to represent the required information. The third column represents the thousands denominational order of the bank number and since three digits are only concerned herein, it is unnecessary to manually punch the third column. Therefore, the machine is conditioned to enable the card carriage to skip to the fourth card column and to this end the skip bar 140 is provided with a high portion 140a (Fig. 13) which cooperates with the beveled end 142 of the skip lifter arm 141 so that the high cam portion will enable the elevation of the skip lifter arm 141 to elevate the stepping dog to permit the carriage to be automatically moved to the fourth column position. At this time, the skip lifter arm will drop into the first notch 140b and the card carriage will remain at this column position. Thereafter, successive manually controlled punching operations ensue to punch the card in the fourth, fifth and sixth column positions, the escapement mechanism previously described causing the step-by-step movement of the punch carriage. Whether or not the operator will continue with a successive punching operation or cause the skipping of the carriage will depend upon the denominational magnitude of the amount on the check and the skipping mechanism herein disclosed is modified so as to eliminate unnecessary punching of zeros which are not at all required when such zeros are to the left or right of the first significant digit of the amount on the check. This will speed up the operation of the machine by reduction of unnecessary punching operations.

*Skipping from column 7 to column 10 when amounts are under $1,000*

The machine includes a special skip circuit by means of which the card carriage may be skipped from column 7 directly to column 10 in which latter column the first digit would be punched if the amounts of the checks are up to $999.99. This will eliminate punching of zeros in columns 7, 8 and 9 in order that the card carriage may be spaced to the tenth column to notch 140c.

Referring to Fig. 12, the skip lifter 141 is mounted at its rear end on a pin 143 which also provides a pivotal connection between a pair of toggle elements 144 and 145. Element 144 is pivoted to the frame on a stud 146 and element 145 is connected to a leaf spring 147. These two elements constitute a toggle held to either side of dead center or neutral position by the spring 147. Pivoted element 144 is formed with oppositely and laterally extending ears 148 and 149. Ear 149 is in front of and normally at a distance from a vertical, depending projection 150 of the bail 549.

Thus far, the old parts of the present skip mechanism have been described and correspond to the skip mechanism structure shown in the patent to Schaaf, 1,426,223, hereinbefore referred to. In the punching machine shown in this patent, the operation of the key causes the shifting of the skip lifter 141 and the skipping of the carriage. In the present machine, the X key 160 (Fig. 1) is located in the separable keyboard located at a distance from the punching machine and it is therefore more convenient to utilize the X key in this keyboard to operate the skipping mechanism. In the present machine, this is performed by an electromagnet 46 (Fig. 12) and the mechanism preferably utilized is that shown in the patent to C. O. Wellman, 2,063,475, dated December 8, 1936.

Engaged with the front ear 148 of element 144 is a pin 152 extending upwardly from the forward end of arm 153a of a bell crank lever 153 journalled on the lower end of a vertically extending fixed pivot 154. The other arm 153b of bell crank 153 extends in front of the skip magnet 46. The arm 153b constitutes the armature of the skip magnet 46.

Magnet 46, when energized, attracts armature 153b to rock bell crank lever 153a, 153b clockwise and as the latter rocks clockwise its pin 152 presses against ear 148 of element 144 to rock the latter counterclockwise. This movement of element 144 actuates skip lifter 141 and the skip lifter is thereafter held in this position, due to the shifting of the toggle comprising elements 144 and 145 to the opposite side of neutral from that shown in Fig. 12.

When the operator has punched column 6 and has observed that the first digit of the amount of the check should be punched in column 10, the skip key or X key 160 (Figs. 1 and 5) is depressed which thereupon closes the bail contacts 529 and its key contacts 161 to extend the circuit from the line 162 through contacts 525, 529, the key contacts 161, to a relay R36, to the line 163. Relay magnet R36 closes its contacts R36AU, extending a circuit from line 162 through contacts 525, through relay contacts R36AU, thence through a relay magnet R35 to the line 163, and also through the skip magnet 46, to the line 163, thereby energizing the skip magnet 46 and the relay magnet R35, which relay magnet, upon its energization, closes its stick contacts R35A, thereby extending the stick circuit through relay contacts R46B and via a line back to the line 162 through the contacts 525. Closure of the X key contacts 161 also closes a circuit to the magnet 535X and such magnet (Fig. 9) will shift its related interposer 539 and rock the bail 541 to close the contacts 543 and energize the magnet 544. As the selected interposer is depressed, the frame 549 will be rocked in the manner previously described and will elevate the stepping dog 550 to disengage the latter from the teeth of the escapement rack 552. This is performed in advance of the shifting of the skip lifter arm 141 so that the energization of the skip magnet 46 directly after the energization of the punch magnet 544 will cause the skip lifter arm 141 to be shifted, retaining the escapement dog 550 in its elevated position free of the escapement rack until the skip lifter arm 141 engages a notch 140C in the skip bar 140 and which is located at column 10 of the card. The card carriage is now in a column 10 position for enabling the punching in this card column. Upon the depression of the next digit key to punch in this column, the relay magnet R46 will be energized by circuits previously described which will open the stick contacts R46B (Fig. 5), thereby de-energizing the skip control magnet 46, enabling the skip lifter arm 141 to be returned to normal by a suitable spring (not shown). Since the skip lifter arm 141 is now in its normal position, the punch carriage may be spaced step-by-step in the usual manner as the punch selecting keys are operated. The return of the toggle element 144 (Fig. 12) is also assisted by the engagement of the depending finger 150 of the frame 549 with the toggle element 144 and as the bail is rocked, the toggle will be positively returned to its initial position as shown in Fig. 12. This results in the positive retraction of the skip lifter. Thus, the first numerical punching following the carriage skip completes restoration of the skipping mechanism.

*Skipping to the last column position upon digit punching in either column 7 or 8*

When the operator has punched the units digit of the bank number in column 6, there is a spacing of the card carriage to the next card column or column 7 and this column is the beginning of the card field in which the digits of the amount of the check are perforated and in this field appears columns 7 to 14 inclusive. Sometimes checks are received which represent amounts in even tens of thousands or thousands of dollars, such as $10,000. or $100,000. or multiples thereof. In such instances, it is only necessary to punch the left hand digit and not the remaining zeros. The present machine is preferably provided with an automatic skipping mechanism which is effective to skip the carriage to the last column position upon punching of this single digit in either column 7 or 8. If column 7 is punched, there will be an automatic space to column 8 and if the carriage is spaced to omit punching in column 7 to next in column 8, there will be a spacing to column 9. When the machine spaces to either column 8 or column 9 and the X key is then operated, the automatic skipping operation now to be described in detail will be effected.

Assuming that the card carriage has stepped to either the eighth or ninth column subsequent to the punching of the single digit in the selected column, it will be noted with particular reference to Fig. 5 that the column selector brush 527 will be in contact with the contact point 529 at either the eighth or ninth column position, thereby extending the circuit from the line 162 through contacts 525, thence through the brush 527, the aforementioned contact points 529, thence to the relay contacts R36AL which are now in open position, thence through the relay R32 to the line 163. When the card carriage is either at the eighth or ninth column position and the amount to be punched consists of zeros at the right thereof, the operator then depresses the X key which, by circuits previously traced, causes the energization of the relay magnet R36 and the latter in turn causes the energization of the relay magnets R35 and the skip magnet 46 as previously described. The relay magnet R36 also closes the contacts R36AL, thereby causing the energization of the relay R32, which closes its stick contacts R32A so that the circuit extends through such contacts back to the line 162 through the contacts 525. It is also pointed out that the stick circuit for the relay magnet R35 and the skip magnet 46 also extends back to the line 162 through the contacts 525, therefore the stick circuit for relay R32, R35 and the skip magnet 46 are held until contacts 525 subsequently open.

In the manner previously described, the skip lifter arm 141 (Fig. 12) is shifted, due to the energization of the skip magnet 46. Also as previously stated, the closure of the contacts 161 by the X key will energize its magnet 535X, shifting the related interposer and by means previously described in detail will cause the closure of the punch contacts 543 and the energization of the magnet 544. This magnet draws downwardly on interposer 539 and rocks the bail 549 and the shaft 553 and, it will be recalled, rocking of this shaft (Fig. 10) will elevate the dog 550, moving it out of engagement with the tooth of the escapement rack 552. At the same time, since the dog 550 is elevated, contacts 564 are open. Since the dog 550 has been elevated to release the carriage for skipping and since the dog 550 has been maintained in raised position by the skip lifter arm 141, the carriage will automatically skip to column 10 at which position there is provided a notch 140C in the skip bar 140 (see Fig. 13). This enables dog 550 to drop downwardly which will cause the closure of the contacts 564 and referring to Fig. 6, a circuit will be closed from the line 162 through contacts 564, thence through relay contacts R32B, relay contacts R35B, through the punch magnet 544 to the line 163. This will send an impulse to the punch magnet 544 which again causes the elevation of the dog 550 out of the tooth of the rack 552, corresponding to column 10. From column 10 to the last column position, the skip bar 140 is provided with a straight portion which will cause the dog 550 to be retained in elevated position. The carriage will thereby skip to the last column position and at such position there automatically ensues a card ejecting operation and then the automatic carriage return effected by the opening of contacts 525 and closure of contacts 622. The opening of contacts 525 will break the stick circuits of the relays R32, R35 and the skip magnet 46 and the parts controlled thereby will return to normal position.

Summarizing the spacing of the card carriage to either the eighth or ninth column position and the operation of the X key at such column position will cause the automatic skipping of the card carriage to the last column position irrespective of the tendency to stop the carriage at column 10.

*Automatic skipping of card carriage upon completion of punching of last digit in amount representing field*

The machine is provided with an arrangement to effect automatic skipping of the card carriage upon completion of the punching of the amount in the units denominational column which, in the example assumed, is the fourteenth column. When this column is punched, the carriage spaces to the fifteenth column position and then skips to the last column position.

Referring to Fig. 5, when the carriage occupies the fifteenth column position, a circuit is closed from the line 162 through contacts 564 to the column selector brush 527 to the contact point 529 at the fifteenth column position, thence through the relay magnet R36 to the line 163. It will be recalled that this is the relay which is energized upon the depression of the X key 160 and as previously explained, the energization of the relay magnet R36 will close its contacts R36AU, thereby energizing the relay R35 and the skip magnet 46. Referring to Fig. 6, a circuit is closed from the line 162 through the relay contacts R36BL, thence through the relay contacts R35B to the punch magnet 544 to line 163. This will cause the elevation of the stepping dog 550 (Fig. 10) as previously explained, thereby raising the dog from the tooth at the fifteenth column position, and since the skip lifter 141 has been shifted, the dog will be retained in its elevated position because beyond the fifteenth column position the skip lifter remains on a continuous high part of the skip bar so as to retain the stepping dog elevated, enabling the carriage to automatically move to the last column position.

Summarizing, therefore, upon spacing the carriage to the fifteenth column position, the automatic skipping mechanism is operative to skip the card carriage to the last column position without any attention on the part of the operator.

AMOUNT REPRESENTING STORAGE DEVICES FOR CONTROLLING PRINTING INSTRUMENTALITIES

As previously intimated, the punching machine has coordinated therewith a printing machine which includes a series of type wheels which are set up under control of storage devices which in turn are set up as the keys are depressed to punch the bank number. These storage devices are set up during the time that the machine is punching the columns 4, 5 and 6 and after punching has been effected in column 6, the printing wheels are restored to normal position from their previous digit representing position so as to be set up under control of the storage devices to represent the new bank number.

From Fig. 5, it will be recalled that the digit representing keys 419 of the punching machine close their related contacts 420 so as to energize the related relays R37—R45 and R48. These relays close their stick contacts so as to retain each relay energized until the successive key 419 is depressed. The relays aforementioned are also adapted to close their related A or B (Fig. 4) contacts as the case may be so that upon the first key depression, certain contacts will be closed to energize a selected relay of a group R1—4 and then upon the next key depression, a selected relay of the group R5—R8 will be energized and upon the third depression of the key, a selected relay of the group R9—R12 will be energized. The coordination of the A or B (Fig. 4) contacts controlled by the relays R37—R45 and R48 with the groups of relays R1—R4, R5—R8 and R9—R12 is effected by three multi-contact relays R25, R26 and R27 which are energized successively as the keys are successively depressed.

It will be noted that upon punching in the fourth column, the contact of the brush selector 527 with the 4 contact point 529 will energize the relay R25. When the brush is positioned to the next column position, relay R26 will be energized and upon contact with the 6 contact point 529, the relay R27 will be energized. The successive energization of these relays will thereby effect the proper coordination between the A and B contacts controlled by the relays energized under control of the keys and the groups of R relays.

Fig. 6b indicates the particular relays of the group R37—R45 and R48 which are energized and also shows that the relays of the selected group of the R relays are energized singly or in combination. For example, upon the depression of the 1 key 419, relay R37 will be energized and by closure of its contacts R37A will select the relay R1 for energization. On the other hand, the 5 key will cause the energization of the relay R41 to thereby cause the energization of the relays R1 and R2. This table can also be applied for determining the energization of the R relays of the other groups. It is pointed out that upon the energization of a selected relay in the different groups of R1—R12 relays, the related stick contact A or AL, as the case may be, will be closed to thereby extend the circuit from the line 163 back to the energized R relay, its related stick contacts and via a line 164 back to the line 162 through the contacts 525. Therefore, as the relays of the different groups of R1—R12 relays are energized, they will be retained energized until contacts 525 open and which, it will be recalled, do so upon the termination of the punching for a complete card. Therefore, as the selected relays of the R1—R12 groups are energized, they will be retained energized, thereby storing up a digital representation which is reflected by the energization of the R1—R12 relays singly or in combination.

Referring to Fig. 4, it will be noted that the relays R1—R4 which are appropriated to the first column set additional contacts AU, BU or BL, as the case may be, to thereby connect a selected digit representing line 165 to a printing control magnet 166 for the first column. The relay and contact arrangement comprises a translator and well known form which translates the combinational setting of the relay contacts to connect the printing control magnet 166 with a selected digit representing line 165.

In the same manner, the groups of relays R5—R8 and R9—R12 connect the printing control magnets 166 for the second and third columns with a selected digit representing line 165.

An emitter Em is connected to the line 162 through a circuit breaker 166a and said emitter has its brush connected to a shaft 223 which will rotated synchronously with the devices to be subsequently described which position the printing wheels to successive digit representing positions.

By such means, the printing magnets 166 are energized at differential times in accordance with the digit representing lines 165 which is selected by the related translator unit. It will be subsequently described how the energization of such printing control magnets will determine the position of the type wheels which are set for representing the bank number.

It is explained that the new setting of the wheels is provided for when the third digit of the bank number has been entered in the storage devices and upon the wheels being set to their new positions they are retained in such position until the check which is to be printed is correlated with the printing wheels and an impression made therefrom. After punching the third digit of the bank number, the operator may continue with successive punching operations to punch the amount on the check without, however, disturbing the setting up of the printing wheels.

PRINTING MACHINE

Figure 1:
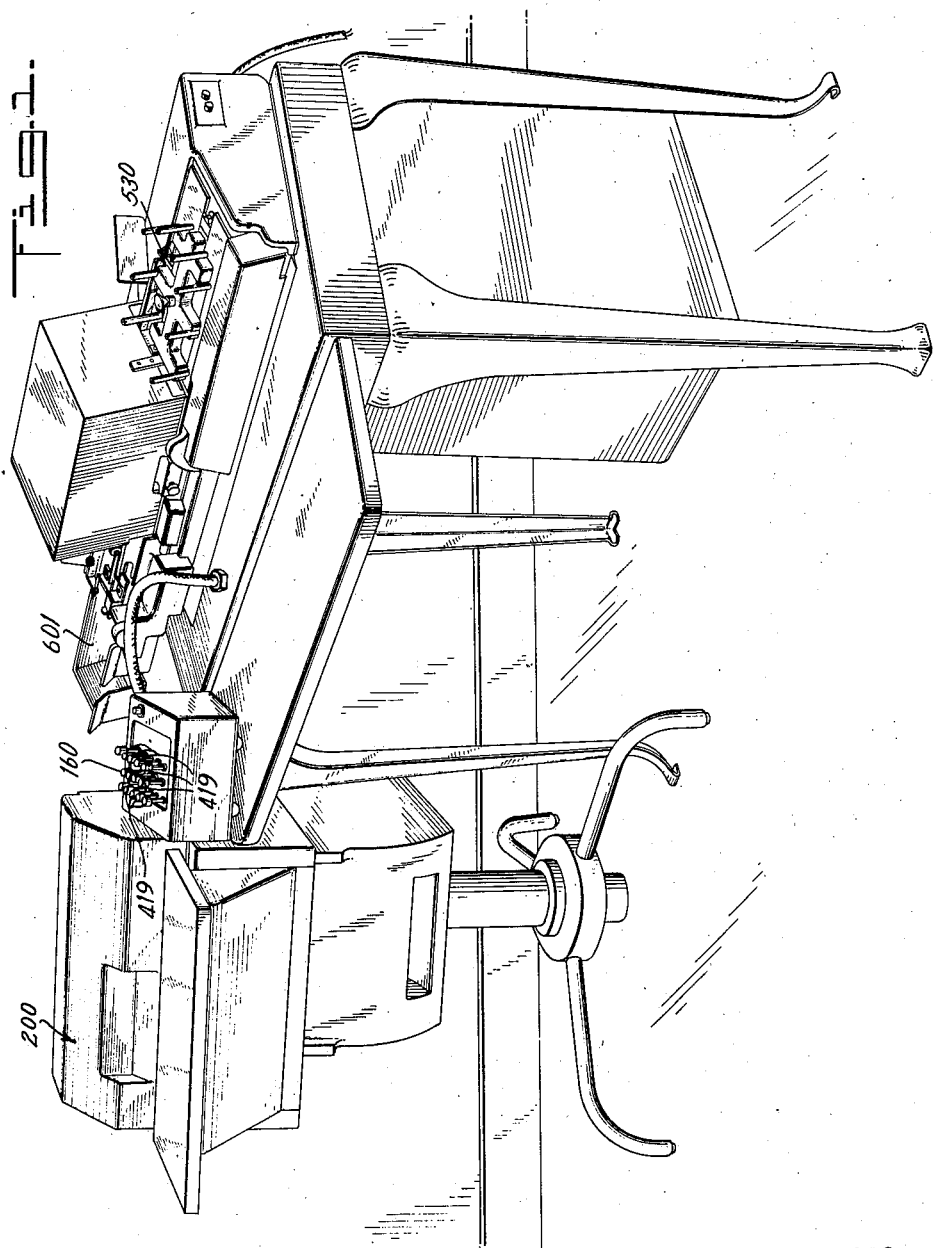
Fig. 1 is a perspective view of the assembled card punching machine and the printing machine which are tied together for inter-related operations by an electrical cable. It should be noted that both of the machines are assembled for convenient access to the operator and both are controlled by a unitary keyboard.

The assembled printing machine is identified by numeral 200 and is shown in Fig. 1. It is located at the left of the keyboard which is utilized for punching operations in which position it is conveniently accessible to the operator for the insertion of the checks after they have been read by the operator for punching the amount and classification number thereon. After the operator is through with a check, the latter is inserted in a chute 201 (Fig. 16) in the printing machine and when in a position determined by suitable abutments in the printing machine, the check will break a beam of light from a lamp 202 and impinging on a photocell 203 (see Fig. 15). The lamp and photocell are diagrammatically shown in Fig. 5. By the interposition of the check the photocell is darkened and by a well known circuit arrangement a relay 204 will be energized. Unless the check is interposed in this manner, there will be no operation of the printing platen and as will be subsequently described in detail, the keys of the keyboard will be locked against further operations. After the operator is through with a check and has read the amounts thereon and punched the corresponding keys of the keyboard, the check is interposed in the chute of the printing machine. However, at the time that the punch carriage is at the sixth column position which represents the completion of punching of the bank number, there will be an automatic setting of the printing wheels to represent this number under control of the storage devices.

At the sixth column position, a circuit is extended through the column contact brush 527

(Fig. 5) to the relay contacts R46A, it being recalled that the magnet R46 is energized each time that a key is depressed, thereby completing the circuit to a clutch control magnet 205. Therefore, there is an energization of the clutch control magnet 205 when the last digit of the bank number has been set up. The energization of the clutch control magnet 205 will initiate certain operations in the printing machine, such as restoring the printing wheels from their previously adjusted position to their newly adjusted position. The setting of the printing wheel takes place during the time that the operator is depressing the keys of the keyboard to punch the amount of the check upon the keyboard.

The printing machine 200 is equipped with a driving motor 206 which is the prime mover of the machine and from Figs. 16 and 17 it will be noted that the armature shaft carries a pinion 207 in mesh with a gear 208 attached to the main drive shaft 209 to which are clutched at different times certain operating parts of the printing machine. Attached to one end of the shaft 209 is a pinion 210 which drives a gear 211 to which gear there is secured a ratchet wheel 212. Since the motor 206 is in continual operation, there will be a continual rotation of the ratchet wheel 212.

In Fig. 14 there is shown in detail a one-revolution clutch which is of a well known form but a detail description will be given in order to understand the construction and operation of this part of the machine. It should be observed that the engagement of the clutch is controlled by the aforementioned magnet 205 which, upon its energization, attracts an armature 205a which unlatches a clutch control arm 213. Mounted on the pivot 214 of the clutch control arm is an arm 215 to which a spring 216 is connected. The arm 215 carries a pin 217 overlying the upper edge of the clutch control arm 213 so that when the latter is unlatched by the armature 205a, the spring 216 will rock the arm 215 counterclockwise and through the pin 217 will rock the lower extremity of the clutch control arm 213 downwardly so as to disengage a shoulder thereof from an extension 218 of a clutch pawl 219 which is in the plane of the ratchet wheel 212. The clutch pawl 219 is pivotally mounted upon an arm 220. Upon the rocking of the clutch control arm 213, the clutch pawl 219 will be rocked by its spring and in the usual manner will effect an engagement with one of the teeth of the constantly rotating ratchet wheel 212, thereby causing the rotation of the arm 220. Secured to the arm 220 is a gear 221 which is in mesh with a gear 222 secured to a drive shaft 223 so that upon the engagement of the clutch the shaft 223 will be driven a complete revolution to effect operations to be subsequently described in detail. Attached to the gear 221 is a member 224 (Fig. 14) provided with a lug 225, which, upon the engagement of the clutch for a full revolution, will engage the upper extension of the arm 215 and return it to its normal position, bringing the pin 217 away from the upper edge of the arm 213. A spring 226 is interconnected between the arm 215 and the clutch control arm 213 so that when the arm 215 has been positively restored to its normal position, the spring will be tensioned to move the clutch control arm 213 to its normal position at which position it will engage the extremity 218 of the clutch pawl 219 to disengage the latter from the ratchet wheel 212. When the clutch control arm 213 is thus restored, its right hand extremity (Fig. 14) will engage a screw stud 227 to rock a bell crank 228, the upper arm of which is in engagement with the armature 205a so as to move the armature to a position to relatch the clutch control arm 213 and also to cause it to be disengaged from the core of the magnet 205 in the event that the armature sticks thereto.

The clutch just described is provided with a supplemental arm 229 which is a rebound preventing member provided in clutch devices of this kind to keep the extremity 218 normally locked between the clutch control arm 213 and the extremity of the arm 229, as shown in Fig. 14.

Referring to Fig. 15, loosely mounted upon a shaft 234 is a pair of sectors 232 which extend upwardly and mounted on the shaft 234 in interspersed relation with the sectors 232 is a sector 233 which extends to the left and downward from the two sectors 232. Each of the sectors 232 and 233 has secured thereto a related segment 235 meshing with a gear to which is attached a related printing wheel 236 provided at its periphery with type so as to print the digits. Since the present machine is to print three digits of the bank number, there will be provided three printing wheels 236 and the arrangement of the sectors 232 and 233 is for compactness of structure to enable the positioning of the printing control magnets 166 in a manner which will not require additional space. The sectors 232 and 233 are arranged for pivotal rocking movement on the shaft 234. Timed rocking movement is imparted to the sectors by bail 237 associated with the two sectors 232 and the bail 238 associated with the sector 233 and which bails are connected together. Bails 237, 238 are connected to their related sectors 232 by springs 239. The bail 238 has secured thereto a spring such as spring 240 which urges rollers 241 carried by arms of the bail 237 against profile cams 242, there being two of such cams as is indicated in Fig. 17. The cams 242 are secured to the shaft 223 and upon the rotation of the shaft 223, the cams 242 will enable the rocking of the bails 237 and 238 against the action of spring 240 and by engagement with the previously adjusted sectors 232 and 233 will first pick up and rock said sectors 232 and 233 counterclockwise so as to bring the printing wheels 236 to such a position that the "9" type are now all at the printing line. Referring to Fig. 17, it will be noted that the shaft 223 carries the brush of the emitter EM, shown in Fig. 4 and as the emitter transmits digit representing impulses in the order 9, 8, 7, 6, etc., the bails 237 and 238 will rock reversely so that, through the interconnected springs 239, the sectors 232 and 233 will be reversely rocked so that the printing type of the printing wheels 236 now presents the type to a printing line in the order 9, 8, 7, 6, etc., synchronously with the transmission of the digit representing impulses. In accordance with the setup of the contacts of each of the three translators, the printing control magnets 166 will be energized at differential times and the magnets will attract their armatures and release stop pawls 243 which engage teeth 244 of the related sectors 232 or 233, thereby stopping the movement of the sectors and retaining the setting of the printing wheels 236, the bails 237 and 238 continuing to their normal position and merely extending the springs 239. In the event that no differentially timed impulses are transmitted to one of the printing control magnets 166, the related printing wheel will go to a "0" digit representing position and in such denominational orders a "0" will be automatically printed and such zeros may be between higher and lower order digits or may be to the left of the lowest order digit.

Arms 245 (Fig. 15) are oscillated by the respective bails 237 or 238 and such arms 245 are pivoted at 246 and connected by a stud 247 to a bail 248 which is also pivoted at 246. The rocking of the bails 248 by the arms 245 are for the purpose of knocking off the armatures of the magnets 166 whenever any armature has been tripped. When the bails 237 and 238 are swung counterclockwise to restore the sectors 232, 233, the pawls 243 will ride on the smooth high parts 249 of the sectors beyond the "9" ratchet tooth position and thus displace the unlatched pawls 243 out of the line of the ratchet teeth. At about this time the leading edge of the respective bails 237 or 238 engages the arm 245 and rocks the bail 248 to therefore knock off the armature and relatch the related pawl 243.

PHOTOCELL SENSING MEANS FOR DETECTION OF INSERTED CHECKS

Further operations in the printing machine are dependent upon the previous insertion of the check in the printing machine and this is preferably detected by a photocell arrangement which is common and well known. As diagrammatically shown in Fig. 4, the arrangement includes a photocell 203, and a lamp 202 which is connected across the lines 162 and 163 which causes light to fall upon the photocell 203. When the light falling upon the photocell is not interrupted, the photocell passes current and which current is passed around a vacuum tube 250 which is of the cold cathode type. This tube has no filament for heating purposes and when voltage is applied between the cathode and starter anode, current will flow between the cathode and anode of the tube 250. When the light is removed from the photocell 203 by the interposition of the check in the chute 201, the photocell 203 ceases to pass current and the tube 250 will operate to energize the relay 204, the circuit to the relay being continued to the line 163 through cam contacts CC2. The relay 204 will close its contacts 204B shown in Fig. 6 which are in a circuit which will be subsequently described. At this time, it should be observed that, as shown in Fig. 6c, cam contacts CC2 subsequently open and break the circuit of the relay to again permit the tube 250 to be reset for another operation.

Since this arrangement is well known in the art relating to photocells and their operation, further description in this specification appears to be unnecessary.

FEEDING MECHANISM FOR INSERTED CHECK

When the punch carriage has skipped to the last column position and after the punched card has been ejected, automatic feeding operations for the inserted check ensue and are initiated by an electric circuit now to be described in detail.

It will be recalled, in the last column position of the punch carriage, contacts 580 (Fig. 5) are closed, thereby energizing relay R33 which will close its contacts R33A, R33B (Fig. 6). Assuming that the check has been inserted, the relay 204 will be energized to close its contacts 204B. A circuit will now be closed from the line 162 through relay contacts R33A, thence through contacts 603 which are closed after the card has been ejected from the punching machine, then through relay contacts R33B, thence through relay contacts 204B to a clutch control magnet 251 to the line side 163.

Referring to Fig. 16, the clutch control magnet 251 will be observed and this magnet is adapted to control a clutch designated generally by the reference character 252 which is similar in construction and operation to the clutch shown in Fig. 14 and previously described in detail. From Figs. 16 and 17, it will be observed that the shaft 209 has secured thereto a pinion 253 meshing with a gear 254 to which is secured a ratchet wheel 255 of the clutch. By means of the clutch, a connection is made between the ratchet wheel 255 and a gear 256 which latter, through an idler gear 257, drives a gear 258. The gear 258 is secured to a drive shaft 259 which is one of the upper roller driving shafts of the machine. The shaft 259 has secured thereto the feeding rollers 260, and shaft 259 is intergeared by gears 261 to feed roll shafts 262, 263 and 264. These carry their related sets of feeding rollers 265. One end of the shaft 259, as observed in Fig. 17, through a system of intergearing 266, drives supplemental feeding rollers 267 which are located in that part of the machine in which the setting mechanism (Fig. 15) for the printing wheels is located. The feeding rollers 260, 265 and 267 constitute the upper set of feeding rollers and in frictional connection with the periphery of such rollers are cooperating supplemental feed rollers 268 which are the lower set of feeding rollers as will be observed from Fig. 16.

When the clutch connection is made, motion is transmitted to the various sets of feeding rollers so that by frictional engagement with the inserted check the latter will be fed between guide plates 269 from the upper to the lower part of the printing machine from which position the check may be suitably ejected to a supply hopper or any other receptacle or if so desired, may be directed to another machine for further printing operations on the inserted check. As the check is fed by the third successive set of rollers, it will be observed that the back face thereof will be beneath the printing wheels 236 and when in such position a platen will be operated so as to effect an impression from said type wheel upon the check. The mechanism for effecting the operation of the platen will now be described in detail.

OPERATION OF PLATEN FOR TAKING PRINTING IMPRESSIONS

Referring to Figs. 15 and 17, the shaft 259 at its end carries a gear 270 which meshes with a gear 271 and rotatable with the latter is an idler gear 272 meshing with an idler gear 273 and the latter in turn is in mesh with an idler gear 274. The gear 274 meshes with a gear 275 secured to a shaft 276 to which a profile cam 277 is secured. Through this intergearing, cam 277 is given a complete rotation each time that the clutch shown in Fig. 16 is engaged.

Pivotally mounted upon a rod 278 is an arm 279 on which is mounted a platen 280 comprising an impression block made of rubber. A spring 282 urges a plate 281 secured to the arm 279 against the outer periphery of the cam 277. After the platen is released, the spiral shaped cam 270 will relatch the platen to the normal position shown. At the time the check is between the printing wheels 236 and the platen 280, the cam 277 will have rotated sufficiently so that the plate 281 will be able to drop to the lowest part of the cam 277, enabling spring 282 to rock the platen 280 so as to effect an impression on the check from the wheels through a conventional inking ribbon 283.

Means is provided to prevent the release of a platen 280 to effect a printing impression unless the check has been fed to the printing position. As shown in Fig. 15, a card lever 284 is in the path of the check which is being fed and when the check has been actually fed to a printing position, the card lever 284 will be rocked to close contacts 285. Referring now to Fig. 5, it will be seen that a circuit will be closed from the line 162, through contacts 285 and through cam contacts CCI and through a magnet 286 to the line side 163. Referring now to Fig. 15, it will be seen that the energization of the magnet 286 attracts its armature, thereby unlatching the latter from a plate 287 attached to the platen arm 279, allowing plate 281 to drop on a lower cam portion 277a of cam 277 and allowing plate 287 to pass beneath the armature Thereafter plate 281 drops off the cam 277 as the latter further rotates to effect the release of the platen. Therefore, if a check has been fed to printing position, magnet 286 will be energized to unlatch the platen and a printing impression will be effected. If the check should, however, jam or otherwise be blocked as it is fed to the printing position, card lever contacts 285 will be open and magnet 286 will not be energized. Since the platen will be latched in normal position, there will be no release thereof and printing impressions will be prevented.

MEANS TO LOCK KEYS AGAINST OPERATION FOR PUNCHING THE NEXT CARD UNLESS CHECK HAS BEEN INSERTED IN THE PRINTING MACHINE

Reference has been previously made to the automatic release of the card carriage of the punching machine when punching operations have been terminated and it will be recalled that during this time the dog 550 will be elevated, thereby opening contacts 564 (Fig. 10). Also at the last column position of the punch carriage, these contacts will also be open and, referring to Fig. 6, it will be seen that the opening of the contacts 564 opens the circuit to relay magnet R47 and the latter will then have its contacts in the position shown to thereby close the circuit to the key locking magnet 435 and cause the same to be energized to lock the keys against operation. This is the condition of the machine when the punch carriage is at the last column position.

It will also be recalled that the circuit to the card ejecting control magnet 595 (Fig. 6) is through contacts 204C. Obviously, if the check has not been inserted in the printing machine, relay contacts 204C will be open and when the carriage is at the last column position, the circuit will be closed through relay contacts R33A but open at the point 204C so that magnet 595 will not be energized. Therefore, there will be no further operations in the punching machine and card ejection will not ensue.. If the operator does not observe this discontinuity in operation, there will be an attempt to depress the keys 420 to punch the card corresponding to the next check but since the key lock magnet 435 is energized under such conditions, the keys 420 will be found to be locked, thus indicating to the operator the failure to previously insert the check in the printing machine.

This interlocking system insures the printing of each check for each card punched and any possible misoperations will be effectively prevented.

With the normal procedure for the punch, contacts 525 will open in the manner previously described and the opening of such contacts will break the stick circuits to the relays of the storage devices and such relays will be deenergized to enable them to be reset in accordance with the data on the next card to be punched.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

We claim:

1. In a device of the class described, the combination of means including punches for punching columns of a record, data storage means, key controlled means for operating punches of said punching means, printing instrumentalities, manns for setting under control of said key controlled means said storage means as said punches are operated, means to connect said setting means to said storage means to set up the latter to represent part of the data punched on said record columns, so that only punching of card columns is effected as the remaining card columns are punched, and means initiated in operation prior to punching said remaining card columns and under control of said storage devices to set up said printing instrumentalities for printing of some of the data punched.

2. In a device of the class described, the combination of means including punches for punching columns of a record, data storage means, key controlled means for operating punches of said punching means, printing instrumentalities, means for setting under control of said key controlled means said storage means as said punches are operated, means to connect said setting means to said storage means to set up the latter to represent part of the data punched on said record columns, so that only punching of card columns is effected as the remaining card columns are punched, means controlled by said storage devices to set up said printing instrumentalities, and means operable upon initiation of punching the remaining card columns to cause the operation of said last named setting means.

3. In a device of the class described, the combination of means including punches for punching columns of a record and including a member moved step by step as the columns are punched, data storage means, key controlled means for operating punches of said punching means, printing instrumentalities, means for setting under control of said key controlled means said storage means as said punches are operated, means under control of said member for causing said setting means to be connected to said storage means to set up the latter to represent part of the data punched on said record columns, so that only punching is effected as the remaining card columns are punched, and means controlled by said storage devices to set up said printing instrumentalities upon completion of setting said storage devices to cause printing of some of the data punched.

4. In a device of the class described, the combination of means including punches for punching columns of a record and including a member moved step by step as the columns are punched, data storage means, key controlled means for operating punches of said punching means, printing instrumentalities, means for setting under control of said key controlled means said storage means as said punches are operated, means under control of said member for causing said setting means to be connected to said storage means to set up the latter to represent part of the data punched on said record columns, means controlled by said storage devices to set up said printing instrumentalities, and means controlled by said member when it is in a card column position for initiating punching of the remaining card columns to cause the operation of said last named means.

5. In a device of the class described, the combination of punching means including punches for punching columns of a record, data storage means, key controlled means for selecting and operating punches of said punching means, printing instrumentalities, means for setting under control of said key controlled means said storage means as said punches are operated, means to connect said setting means to said storage means to set up the latter to represent only part of the data punched on said record columns, so that only punching is effected as the remaining card columns are punched, means initiated in operation by said punching means prior to punching the remaining card columns and under control of said storage devices to set up said printing instrumentalities, and further means initiated in operation by said punching means upon completion of punching the remainig card colums to cause a printing impression to be taken from said printing instrumentalities.

6. In a recording apparatus, the combination of punching means including punches for punching card columns, a series of keys, data storage means, means controlled by said keys for selecting and operating said punches and for setting said storage devices, said setting means including controlling means rendered operative as certain card columns are punched to cause the storage devices to be set to represent only part of the data punched, printing means comprising printing instrumentalities and including feeding means to feed record material other than the punched card to printing position with respect to said printing instrumentalities, means rendered operative by said punching means to effect the setting of said printing instrumentalities under control of said storage devices while other card columns are being punched, and further means initiated in operation by said punching means when all card columns have been punched to cause the operation of the feeding means to feed said record material to said printing position and to effect a printing impression from the printing instrumentalities on the record material when it is in a printing position.

7. In a recording apparatus, the combination of punching means including punches for punching card columns, a series of keys, data storage means, means controlled by said keys for selecting and operating said punches and for setting said storage devices, printing means comprising said storage devices, printing instrumentalities and including feeding means to feed record material other than said card to printing position with respect to said printing instrumentalities, means rendered operative by said punching means to effect the setting of said printing instrumentalities under control of said storage devices, means initiated in operation by said record material when the latter is manually inserted in said record feeding means to cause the operation of the feeding means to feed said record material to said printing position, and means to effect a printing impression from the printing instrumentalities when the record material is in a printing position.

8. In a recording apparatus, the combination of punching means including punches for punching card columns and card ejecting means therefor, a series of keys, data storage means, means controlled by said keys for selecting and operating said punches and for setting said storage devices, said punching means including controlling means rendered operative after all card columns are punched to cause the operation of said card ejecting means, printing means comprising printing instrumentalities and including feeding means to feed record material other than said card to printing position with respect to said printing instrumentalities, means rendered operative by said punching means to effect the setting of said printing instrumentalities under control of said storage devices, further means rendered operative by said card ejecting means to cause the operation of the feeding means to feed record material to said printing instrumentalities, and means to effect a printing impression from the printing instrumentalities on said record material when the latter is in a printing position.

9. In a recording apparatus the combination of a series of keys, printing means including settable printing instrumentalities thereof, punching means, means controlled by said keys for effecting the selection and operation of said punching means to punch columns of a record corresponding to data on record material other than said card, means for causing the setting of said printing instrumentalities under control of said keys to print data on said record material, automatically operable means initiated by said punching means for locking said keys upon the completion of card punching operations, means responsive to the insertion of said record material to said printing means for disabling said locking means to unlock said keys, and means to effect a printing impression on the record material from said printing instrumentalities.

10. In a recording apparatus the combination of a series of keys, printing means including settable printing instrumentalities thereof, punching means, means controlled by said keys for effecting the selection and operation of said punching means to punch columns of a record corresponding to data on record material other than said card, means for causing the setting of said printing instrumentalities under control of said keys to print data on said record material, automatically operable means initiated by said punching means for locking said keys upon the completion of card punching operations, means for feeding record material manually inserted therein to said printing instrumentalities, means responsive to the manual insertion of the record material in said feeding means for disabling said locking means to unlock said keys, and means to effect a printing impression on the record material from said printing instrumentalities.

11. In a recording apparatus the combination of a series of keys, punching means, printing instrumentalities, means controlled by said keys for effecting the selection and operation of said punching means to punch columns of a record corresponding to data on record material other than said card, means for causing the setting of said printing instrumentalities under control of said keys to print data on said record material, automatically operable means initiated by said punching means for locking said keys upon the completion of card punching operations, means for feeding said record material manually inserted therein to said printing instrumentalities, means controlled jointly by said punching means when punching operations are completed and the record material by its insertion in said feeding means to cause the operation of said record feeding means to feed the record material to printing position with respect to said printing instrumentalities, means responsive to the insertion of the record in the record feeding means to disable said locking means to unlock said keys, and means to effect a printing impression on the record material from said printing instrumentalities.

WILLIAM L. LEWIS.
ELLIOTT W. GARDINOR.